US008759734B2

(12) United States Patent
Barrilleaux

(10) Patent No.: US 8,759,734 B2
(45) Date of Patent: Jun. 24, 2014

(54) DIRECTIONAL SENSORS FOR AUTO-COMMISSIONING LIGHTING SYSTEMS

(75) Inventor: Jonathan M. Barrilleaux, Oakland, CA (US)

(73) Assignee: Redwood Systems, Inc., Fremont, CA (US)

( * ) Notice: Subject to any disclaimer, the term of this patent is extended or adjusted under 35 U.S.C. 154(b) by 307 days.

(21) Appl. No.: 13/403,544

(22) Filed: Feb. 23, 2012

(65) Prior Publication Data

US 2013/0221203 A1    Aug. 29, 2013

(51) Int. Cl.
*G01J 1/32* (2006.01)
(52) U.S. Cl.
USPC .......................................... 250/205; 250/221
(58) Field of Classification Search
USPC ............ 250/205, 221, 214 R, 214 AL, 214.1; 362/276, 240, 231; 315/151, 149, 158
See application file for complete search history.

(56) References Cited

U.S. PATENT DOCUMENTS

| | | | |
|---|---|---|---|
| 4,532,713 A | 8/1985 | Feichtinger | 33/559 |
| 4,914,284 A | 4/1990 | Halldorsson et al. | 250/206.2 |
| 5,187,655 A | 2/1993 | Post et al. | 364/146 |
| 5,250,799 A * | 10/1993 | Werner | 250/214 AL |
| 5,281,807 A | 1/1994 | Poisel et al. | 250/216 |
| 5,319,188 A | 6/1994 | Cole | 250/206.2 |
| 5,448,359 A | 9/1995 | Schick et al. | 356/375 |
| 5,587,580 A | 12/1996 | Venier et al. | 250/206.1 |
| 5,662,411 A | 9/1997 | Haslam et al. | 362/276 |
| 6,046,550 A | 4/2000 | Ference et al. | 315/291 |
| 6,230,137 B1 | 5/2001 | Has et al. | 704/275 |
| 6,266,136 B1 | 7/2001 | Ramer et al. | 356/139.03 |
| 6,846,116 B2 | 1/2005 | Oka et al. | 385/92 |
| 6,888,633 B2 | 5/2005 | Vander Jagt et al. | 356/407 |
| 6,987,571 B2 | 1/2006 | Yamakawa et al. | 356/600 |
| 7,014,336 B1 | 3/2006 | Ducharme et al. | 362/231 |

(Continued)

FOREIGN PATENT DOCUMENTS

| | | | | |
|---|---|---|---|---|
| DE | 202 08 061 U1 | 9/2002 | | H04Q 9/00 |
| EP | 0 481 387 B1 | 1/1996 | | G01D 5/26 |

(Continued)

OTHER PUBLICATIONS

U.S. Appl. No. 13/328,313, filed Dec. 16, 2011, Barrilleaux.

(Continued)

*Primary Examiner* — Que T Le
(74) *Attorney, Agent, or Firm* — Myers Bigel Sibley & Sajovec, P.A.

(57) ABSTRACT

Systems and methods for spatial commissioning of a lighting system are provided. A determination of which sensors receive a light signal from one or more emitter devices may be made. Each one of the sensors and/or each one of the emitter devices may provide a direction of the light signal detected by a respective one of the sensors. The direction of the light signal detected by the respective one of the sensors may be detected. A sensor graph based on the direction of the light signal may be generated, where nodes of the sensor graph represent the sensors and/or the emitter devices. Each one of the sensors and/or the emitter devices may be mapped to a corresponding location in a site model based on the sensor graph and on the site model, where locations of the sensors and/or the emitter devices are indicated by the site model.

18 Claims, 8 Drawing Sheets

(56) References Cited

U.S. PATENT DOCUMENTS

| | | | |
|---|---|---|---|
| 7,190,126 B1 | 3/2007 | Paton | 315/308 |
| 7,342,671 B2 | 3/2008 | Ito | 356/616 |
| 7,387,405 B2 | 6/2008 | Ducharme et al. | 362/231 |
| 7,520,634 B2 | 4/2009 | Ducharme et al. | 362/276 |
| 7,689,130 B2 | 3/2010 | Ashdown | 398/172 |
| 7,919,937 B2 | 4/2011 | Tracy et al. | 315/307 |
| 7,924,415 B2 | 4/2011 | Leviton | 356/139.02 |
| 8,008,613 B2 | 8/2011 | Tam | 250/226 |
| 8,159,156 B2 | 4/2012 | Henig et al. | 315/363 |
| 2003/0015302 A1 | 1/2003 | Pessina et al. | 160/331 |
| 2003/0057887 A1 | 3/2003 | Dowling et al. | 315/291 |
| 2003/0107888 A1 | 6/2003 | Devlin et al. | 362/233 |
| 2003/0210167 A1 | 11/2003 | Weng | 341/176 |
| 2004/0105264 A1 | 6/2004 | Spero | 362/276 |
| 2005/0025480 A1 | 2/2005 | Yeh | 398/12 |
| 2005/0097162 A1 | 5/2005 | Budike, Jr. | 709/201 |
| 2005/0110416 A1 | 5/2005 | Veskovic | 315/149 |
| 2006/0202851 A1 | 9/2006 | Cash et al. | 340/825.69 |
| 2007/0273307 A1 | 11/2007 | Westrick et al. | 315/312 |
| 2008/0088435 A1 | 4/2008 | Cash et al. | 340/539.11 |
| 2008/0186720 A1 | 8/2008 | Verbrugh | 362/383 |
| 2008/0218087 A1 | 9/2008 | Crouse et al. | 315/131 |
| 2008/0265802 A1 | 10/2008 | Van de Sluis et al. | 315/297 |
| 2008/0297068 A1 | 12/2008 | Koren et al. | 315/297 |
| 2009/0033460 A1 | 2/2009 | Mack et al. | 340/5.71 |
| 2009/0045971 A1 | 2/2009 | Simons et al. | 340/825.52 |
| 2009/0086487 A1 | 4/2009 | Ruud et al. | 362/249.02 |
| 2009/0087134 A1 | 4/2009 | Martinez | 385/12 |
| 2009/0218951 A1 | 9/2009 | Weaver | 315/154 |
| 2009/0230894 A1 | 9/2009 | De Goederen et al. | 315/314 |
| 2009/0236910 A1 | 9/2009 | Yamada et al. | 307/40 |
| 2009/0267540 A1 | 10/2009 | Chemel et al. | |
| 2009/0273433 A1 | 11/2009 | Rigatti et al. | 340/3.5 |
| 2009/0284747 A1 | 11/2009 | Valois | 356/448 |
| 2010/0084992 A1 | 4/2010 | Valois et al. | 315/291 |
| 2010/0188009 A1 | 7/2010 | Bull | 315/246 |
| 2010/0214082 A1 | 8/2010 | Covaro et al. | 340/310.12 |
| 2010/0283605 A1 | 11/2010 | Nevins | 340/540 |
| 2010/0315010 A1 | 12/2010 | Damink et al. | 315/152 |
| 2011/0031897 A1 | 2/2011 | Henig et al. | 315/297 |
| 2011/0076024 A1 | 3/2011 | Damink | 398/130 |
| 2011/0140832 A1 | 6/2011 | Vinkenvleugel et al. | 340/4.2 |
| 2011/0175533 A1 | 7/2011 | Holman et al. | 315/130 |
| 2011/0199004 A1 | 8/2011 | Henig et al. | 315/152 |
| 2011/0199020 A1 | 8/2011 | Henig et al. | 315/294 |
| 2011/0202151 A1 | 8/2011 | Covaro et al. | 700/90 |
| 2011/0234366 A1 | 9/2011 | Feng et al. | 340/3.1 |

FOREIGN PATENT DOCUMENTS

| | | | | |
|---|---|---|---|---|
| WO | WO 03/078894 A1 | 9/2003 | | F21V 21/15 |
| WO | WO 2006/048916 A2 | 5/2006 | | H05B 33/08 |
| WO | WO 2006/095316 A1 | 9/2006 | | H05B 37/02 |
| WO | WO 2006/099422 A2 | 9/2006 | | G08C 19/00 |
| WO | WO 2007/132382 A2 | 11/2007 | | H05B 37/02 |
| WO | WO 2007/138494 A1 | 12/2007 | | G06F 3/14 |
| WO | WO 2009/150581 A1 | 12/2009 | | H05B 37/02 |
| WO | WO 2010/146446 A1 | 12/2010 | | F21V 21/15 |

OTHER PUBLICATIONS

U.S. Appl. No. 13/442,354, filed Apr. 09, 2012, Henig et al.
Starsense Brochure, dated 2008, pp. 1-7, Philips Lighting B.V., The Netherlands, available at http://www.philips.com/starsense.
Application Note #138, "Control of LED Lighting", dated Sep. 2007, pp. 1-8, Lutron Electronics Co., Inc., Coopersburg, PA, available at www.lutron.com.
Digital Addressable Lighting Interface, downloaded Aug. 10, 2009, pp. 1-2, Answers.com, available at http://www.answers.com.

\* cited by examiner

DIRECTIONAL SENSORS FOR AUTO-COMMISSIONING LIGHTING SYSTEMS

BACKGROUND

1. Technical Field

This application relates to lighting systems and, in particular, to commissioning of lighting systems.

2. Related Art

By some estimates, lighting may account for over 30 percent of energy use in buildings. Therefore, finding ways to increase lighting efficiency may result in significant savings. Options for reducing energy use include installing energy-efficient lights and making good use of natural daylight. Timers and sensors may also be used in lighting systems to control when lights are turned off and on in order to reduce energy consumption.

SUMMARY

A system for spatially commissioning a lighting system may be provided. The system for spatial commissioning may include sensors, emitter devices, and an auto-commissioning module. The emitter devices may emit a light signal. Each one of the sensors and/or each one of the emitter devices may provide a direction of the light signal detected by a respective one of the sensors. The auto-commissioning module may determine which of the sensors receive the light signal from any of the emitter devices. The auto-commissioning module may receive the direction of the light signal detected by the respective one of the sensors, the direction of the light signal provided by at least one of the sensors and/or at least one of the emitter devices. The auto-commissioning module may generate a sensor graph based on the direction of the light signal that is detected by the sensors, where nodes of the sensor graph represent the sensors and/or the emitter devices. The auto-commissioning module may map each one of the sensors and/or the emitter devices to a corresponding location in a site model based on the sensor graph and on the site model, where locations of the sensors and/or the emitter devices are indicated by the site model.

A method for spatially commissioning a lighting system may be provided. A determination of which sensors receive a light signal from one or more emitter devices may be made. Each one of the sensors and/or each one of the emitter devices may provide a direction of the light signal detected by a respective one of the sensors. The direction of the light signal detected by the respective one of the sensors may be detected. A sensor graph based on the direction of the light signal that is detected by the sensors may be generated, where nodes of the sensor graph represent the sensors and/or the emitter devices. Each one of the sensors and/or the emitter devices may be mapped to a corresponding location in a site model based on the sensor graph and on the site model, where locations of the sensors and/or the emitter devices are indicated by the site model. The locations of the sensors and/or the emitter devices may be indicated by the site model in any number of ways, such as when the site model explicitly includes the locations or when the site model includes locations of light fixtures whose spatial relationship to the sensors and/or the emitter devices is known.

A tangible non-transitory computer-readable medium may be provided that is encoded with computer executable instructions that, when executed, perform the method for spatially commissioning the lighting system. In one interesting aspect, a directional sensor may be provided that includes a sensor head and multiple photosensors. The sensor head may include multiple facets. Each one of the photosensors may be coupled to a corresponding one of the facets. A field of view of each one of the photosensors may be limited by the corresponding one of the facets such that a direction of light received by any one of the photosensors is indicated by which of the photosensors receives the light.

Further objects and advantages of the present disclosure will be apparent from the following description, reference being made to the accompanying drawings wherein preferred embodiments of the present disclosure are shown.

BRIEF DESCRIPTION OF THE DRAWINGS

The embodiments may be better understood with reference to the following drawings and description. The components in the figures are not necessarily to scale, emphasis instead being placed upon illustrating the principles of the disclosure. Moreover, in the figures, like-referenced numerals designate corresponding parts throughout the different views.

DETAILED DESCRIPTION

Figure 1:
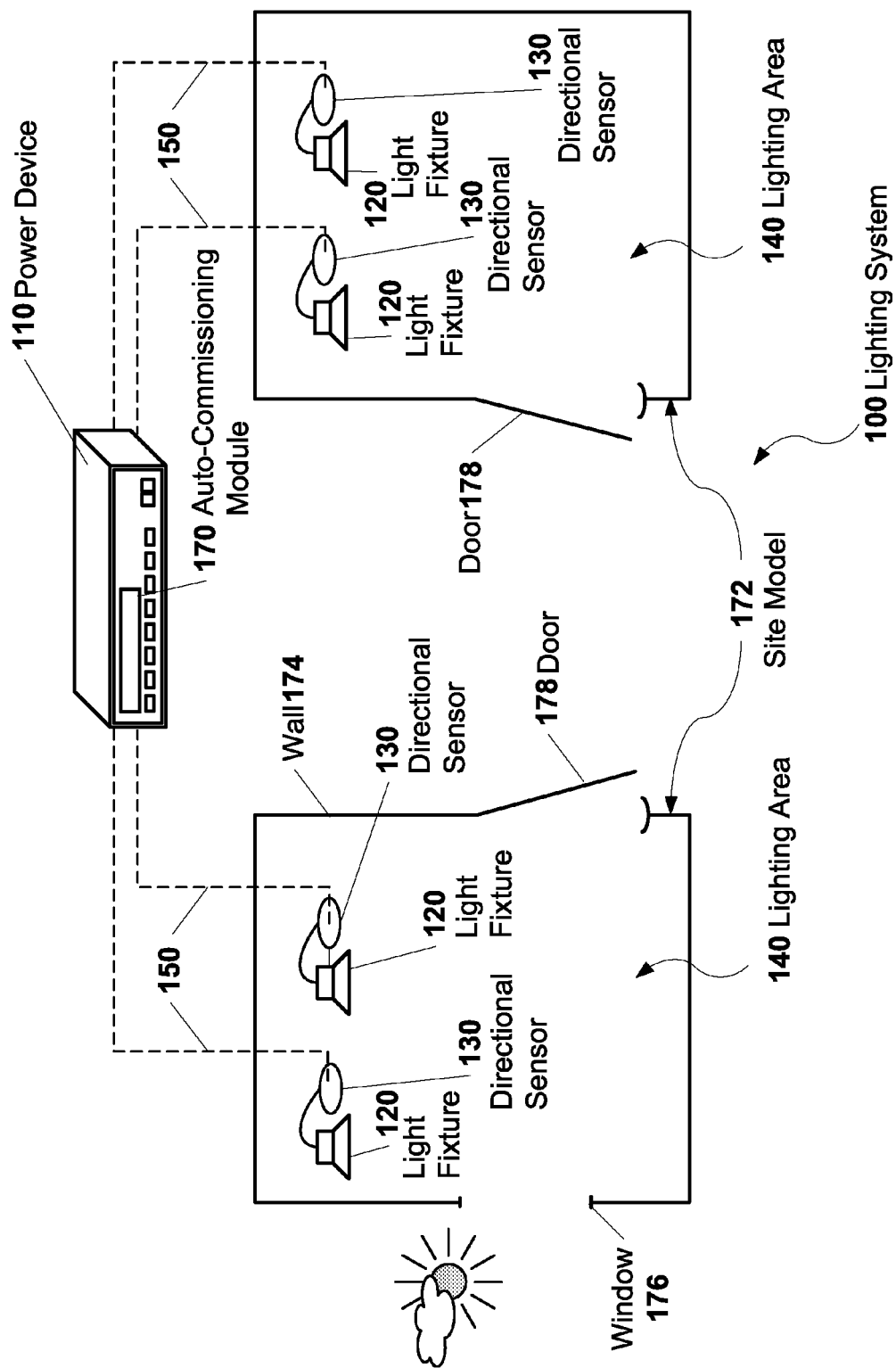
FIG. 1 illustrates an example of a lighting system.

By way of an example, a system for spatially commissioning a lighting system may be provided. The system for spatial commissioning may include directional sensors, directional emitter devices, and an auto-commissioning module. The directional emitter devices may emit a light signal. The directional sensors may detect the light signal. Each one of the directional sensors and/or each one of the directional emitter devices may provide a direction of the light signal that is generated by a respective one of the directional emitter devices and detected by a respective one of the directional sensors. In some examples, each one of the directional sensors may include a corresponding one of the directional emitter devices. For example, each one of the directional sensors may include a sensor head comprising multiple facets, where a photosensor and an emitter is coupled to each respective one of the facets. The direction of the light signal generated by any of the emitters and/or detected by any of the photosensors may be indicated by the facet to which the emitter and/or the photosensor is coupled. Each emitter may be an LED or any component that produces light detectable by the photosensors. The auto-commissioning module may determine which of the directional sensors receive the light signal from any of the directional emitter devices. The auto-commissioning module may receive the direction of the light signal detected by the respective one of the directional sensors, where the direction of the light signal is provided by at least one of the directional sensors and/or at least one of the directional emitter devices.

The auto-commissioning module may generate a sensor graph based on the direction of the light signal that is detected by the directional sensors, where nodes of the sensor graph represent the directional sensors and/or the directional emitter devices. The auto-commissioning module may map each one of the directional sensors and/or the directional emitter devices to a corresponding location in a site model based on the sensor graph and on the site model, where locations of the directional sensors and/or the directional emitter devices in a physical site are indicated by the site model. The site model may indicate the locations of the sensors and/or the emitter devices in any number of ways. For example, the site model may explicitly include the locations of the directional sensors and/or the directional emitter devices. Alternatively or in addition, the site model may include locations of light fixtures whose spatial relationship to the sensors and/or the emitter devices may be known. For example, if the light fixtures include the sensors and/or the emitter devices, then the locations of the light fixtures in the site model may also be the locations of the sensors and/or the emitter devices. Alternatively or in addition, if each one of the directional sensors and/or the directional emitters is located near a corresponding one of the light fixtures, then the locations of the light fixtures in the site model may indicate the locations of the directional sensors and/or the directional emitters.

FIG. 1 illustrates an example of a lighting system 100. The lighting system 100 may include a power device 110, light fixtures 120, and directional sensors 130. The lighting system 100 may include any number of light fixtures 120, directional sensors 130, and power devices 110.

Each light fixture 120 or luminaire may be any electrical device or combination of devices that creates artificial light from electricity. The light fixture 120 may distribute, filter or transform the light from one or more lamps included or installed in the light fixture 120. Alternatively or in addition, the light fixture 120 may include one or more lamps. The lamps may include incandescent bulbs, LED lights, fluorescent tubes, any other device now known or later discovered that generates artificial light, or any combination thereof. Each of the light fixtures 120 may be located anywhere in or near a lighting area 140. Light generated by one or more of the light fixtures 120 may illuminate the lighting area 140. The light fixture 120 may be coupled to a ceiling, a floor, a wall, or some other surface of a building or physical structure from which the light fixture 120 may project light into the lighting area 140. The light fixtures 120 may illuminate any number of lighting areas 140. When coupled to a surface, the light fixture 120 may be embedded below the surface, installed partially below the surface, positioned on the surface, located in a housing, or positioned in any other suitable configuration with respect to the surface so that the light fixture 120 may transmit light into one or more of the lighting areas 140. The light fixture 120 may be affixed to the surface or be adjacent to the surface. Examples of the light fixture 120 include a compact fluorescent light, a task/wall bracket fixture, a linear fluorescent high-bay, a spot light, a recessed louver light, a desk lamp, a troffer, or any other device that includes one or more lamps.

The lighting area 140 may include any physical space that may be illuminated by one or more of the light fixtures 120. The lighting area 140 may include an area outside of a building, an area inside of a building, a room, a portion of the room, a workspace, any other area that may be lit by at least one of the light fixtures 120, or any combination thereof. The lighting area 140 may be represented as a two-dimensional space or a three-dimensional space.

The directional sensor 130 may be any device or combination of devices that detects light emitted by a light source and provides an indication of a direction from which the detected light or signal is received. The light source, also referred to as an emitter, may be any device or combination of devices that emits light. The light may be visible, such as white light, or invisible, such as infrared light. The light fixtures 120, the directional sensors 130, or both may be associated with or include the emitters. Examples of the directional sensor 130 and the emitter are provided later below. The directional sensor 130 may be located anywhere in or near the lighting area 140. In one example, the directional sensor 130 may be included in the light fixture 120. In a second example, the directional sensor 130 may be positioned adjacent to or near the light fixture 120. In a third example, the directional sensor 130 may be coupled to a ceiling, a floor, a wall, or some other surface of a building or physical structure where light in the lighting area 140 may be detected. When coupled to a surface, the directional sensor 130 may be embedded below the surface, installed partially below the surface, installed above the surface, positioned on the surface, located in a housing, or be positioned in any other suitable configuration with respect to the surface so that the directional sensor 130 may receive light present in the lighting area 140.

The power device 110 may be any device or combination of devices that supplies power to the light fixtures 120. For example, the power device 110 may include AC/DC (Alternating Current/Direct Current) converters that power the light fixtures 120. Alternatively or in addition, the power device 110 may include DC/DC converters that power the light fixtures 120. The power device 110 may be electrically coupled to each of the light fixtures 120 with twisted-pair wiring, 12 AWG (American Wire Gauge) building wiring, 18 AWG wiring, or any other type of wiring 150.

The power device 110 may provide power to, and communicate with, the directional sensors 130. In one example, each corresponding one of the directional sensors 130 may be electrically coupled to wiring 150 that powers a corresponding one of the light fixtures 120. Accordingly, the power device 110 may provide power over the wiring 150 to the directional sensor 130 and to the corresponding light fixture 120. The directional sensor 130 may transmit information, such as sensor data, over the wiring 150 to the power device 110. Communication between the directional sensor 130 and the power device 110 may be unidirectional or bidirectional.

The power device 110 may include an auto-commissioning module 170 that performs auto-commissioning of the lighting system 100. When the lighting system 100 is installed, the light fixtures 120 and the directional sensors 130 may be electrically coupled to the power device 110. When the light fixtures 120 and the directional sensors 130 are first electrically coupled to the power device 110, the power device 110 may be able to power the light fixtures 120, and receive information from the directional sensors 130. However, the power device 110 may not yet have any information about which one of the lighting areas 140 is illuminated by each one of the light fixtures 120. Grouping the light fixtures 120 by the lighting area 140 that the light fixtures 120 illuminate, may be desirable. For example, the light fixtures 120 that illuminate a corresponding one of the lighting areas 140 may be grouped together. Thereafter, each group of the light fixtures 120 may be controlled as a group. For example, all of the light fixtures 120 in one group may be turned off if no person is detected in the lighting area 140 that the group of the light fixtures 120 illuminates.

Similarly, the power device 110 may not have any information about which of the directional sensors 130 detect light in each one of the lighting areas 140. Such aggregate knowledge may be used by the power device 110 to control the light fixtures 120 that illuminate each of the lighting areas 140 based on sensor information received from any or all of the directional sensors 130 or other sensor(s) in one or more of the lighting areas 140. For example, the power device 110 may use such knowledge to turn off the light fixtures 120 in one group if no person is detected by the lighting system 100 in the corresponding lighting area 140.

In other words, the power device 110 may not have knowledge of which of the light fixtures 120 and/or the directional sensors 130 are colocated. A group of the light fixtures 120 may be colocated if each of the light fixtures 120 in the group illuminate the same lighting area 140 as the other light fixtures 120 in the group. Similarly, a group of the directional sensors 130 may be colocated if each of the directional sensors 130 in the group detects light in the same lighting area 140 as the other directional sensors 130 in the group. Any of the light fixtures 120 may be colocated with any of the directional sensors 130 if the directional sensor 130 detects light in the same lighting area 140 that the light fixture 120 illuminates. Alternatively or in addition, any of the light fixtures 120 may be considered colocated with any of the directional sensors 130 if the directional sensor 130 detects a light signal or signature that is generated by the light fixture 120. Alternatively or in addition, a determination may be made that the directional sensor 130 detects light from a selected light source, such as the light fixture 120 and/or the emitter, if a signal or signature generated by the selected light source is detected by the directional sensor 130 and/or a signal or signature filter.

The process of forming logical associations or groups of the light fixtures 120 that are colocated and/or groups of the directional sensors 130 that are colocated is known as logically commissioning the lighting system 100. Commissioning may be automated using auto-commissioning. One mechanism to perform auto-commissioning includes sequentially causing each of the light fixtures 120 to illuminate individually and determining which of the directional sensors 130 detect light when the light fixture 120 is illuminated. The directional sensors 130 that detect light when the light fixture 120 is illuminated may be considered colocated with the light fixture 120. More generally, auto-commissioning may involve modulating one or more emitters, such as one or more of the light fixtures 120, so that illumination of the lighting areas 140 by the light fixtures 120 is undisturbed by a signifying and an identification of the emitters. To occupants of the lighting areas 140, the illumination may be maintained while the system 100 may signify and identify the emitters modulated by the system 100. Also, a mechanism to perform auto-commissioning may involve sequentially, or in parallel, causing one or more of the emitters colocated with each corresponding one of the light fixtures 120 to illuminate or signify. In one example, the emitter colocated with each corresponding one of the light fixtures 120 may be a light source, such as an LED, that is dedicated to performing auto-commissioning. For example, the directional sensor 130 that is colocated with a corresponding one of the light fixtures 120 may include one or more of the emitters as described below. In a second example, the emitter colocated with each corresponding one of the light fixtures 120 may be the lamp or lamps included in each corresponding one of the light fixtures 120. Any of the directional sensors 130 may be determined to be colocated with the light fixture 120 if the directional sensor 130 detects a level of light that exceeds a threshold light level when the emitter is illuminated. The light fixtures 120 that are determined to be colocated with one of the directional sensors 130 may be determined to be colocated with each other. U.S. Patent Application Publication 2011/0031897 A1, published Feb. 10, 2011, describes methods of commissioning a lighting system.

Prior to or during the commissioning of the lighting system 100, the system 100 may receive or generate a site model 172. The site model 172 may be a floor plan, a CAD (computer-aided drafting), a BIM (building information modeling) model, or any other type of model of the architecture of a site that the lighting system 100 illuminates. The site model 172 may include locations of structural items such as walls 174, windows 176, doors 178, and rooms. Alternatively or in addition, the site model 172 may include locations of physical items that are related to daylighting, such as the location and characteristics of the windows 176, skylights, light tubes, controllable shades and blinds, or any other type of shading device. The site model 172 may also include the placement or location of the light fixtures 120 and/or the directional sensors 130 relative to the structural and/or physical items. The site model 172 may include the placement or location of any other type of fixtures, such as switches, dimmers, and controls. In one example, the site model 172 may include geographic information such as latitude/longitude position and elevation, and site orientation.

The site model 172 may be received by the auto-commissioning module 170. For example, the site model 172 may be entered by a user using a graphical user interface, imported from a file, or received using any other mechanism for inputting data.

As described above, commissioning the lighting system 100 may be performed after installation of the lighting system 100. In addition to determining whether the light fixtures 120 are colocated (logical commissioning), commissioning the lighting system 100 may include spatial commissioning. Spatial commissioning may include determining the locations of the light fixtures 120 and/or the directional sensors 130 within the lighting system 100. In one example, the locations of the light fixtures 120 and/or the directional sensors 130 may include the position of the light fixtures 120 and/or the directional sensors 130 relative to a point, such as a corner of a building, where the position is a two-dimensional or three-dimensional coordinate. In a second example, the locations may include latitude and longitude coordinates.

Alternatively or in addition, spatially commissioning the lighting system 100 may include determining locations of the light fixtures 120 and/or the directional sensors 130 within the site model 172. For example, each one of the locations within the site model 172 may be an identity of a corresponding one of the light fixtures 120 and/or the directional sensors 130 that is represented in the site model 172. In other words, spatial commissioning may include mapping the light fixtures 120 and/or the directional sensors 130 onto the site model 172.

Spatial commissioning may help ensure that the lighting system 100 performs interactively according to documented design intent and operational needs of the site. Spatial commissioning may help ensure proper equipment operation and intended energy savings in both new construction and remodeling projects. Spatial commissioning may provide for more precise control of the lighting system 100 than logical commissioning alone provides. If the lighting system 100 performs spatial commissioning, then the system 100 may know the spatial position of each of the light fixtures 120, the directional sensors 130, or any combination thereof, within the site model 172. Accordingly, the spatial position of each of the light fixtures 120, the directional sensors 130, any other type of fixture in the lighting system 100, or any combination thereof, may be available to users of the lighting system 100.

As explained later below in more detail, the auto-commissioning module 170 may map the light fixtures 120 onto the site model 172 during operation of the lighting system 100. Once the locations of the light fixtures 120 and/or the directional sensors 130 are assigned or mapped to the site model 172, the power device 110 may control the lighting system 100 based on the site model 172. For example, the site model 172 may be displayed in a graphical user interface, and based on selection of an area of the site model 172 made through the graphical user interface, the power device 110 may adjust the light produced by the light fixtures 120 that are in the lighting area 140 represented by the selected area of the site model 172.

Figure 2A:
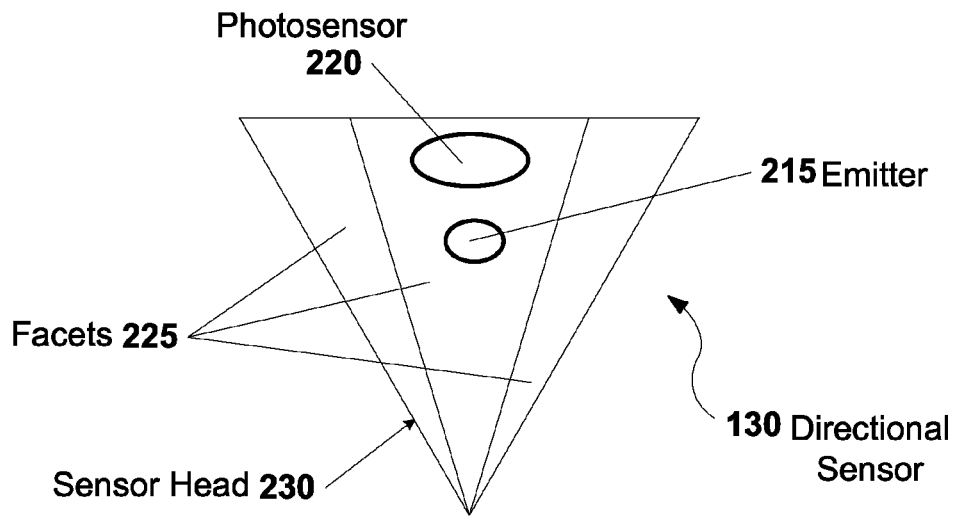
FIG. 2A illustrates a frontal view of an example of a directional sensor.
Figure 2B:
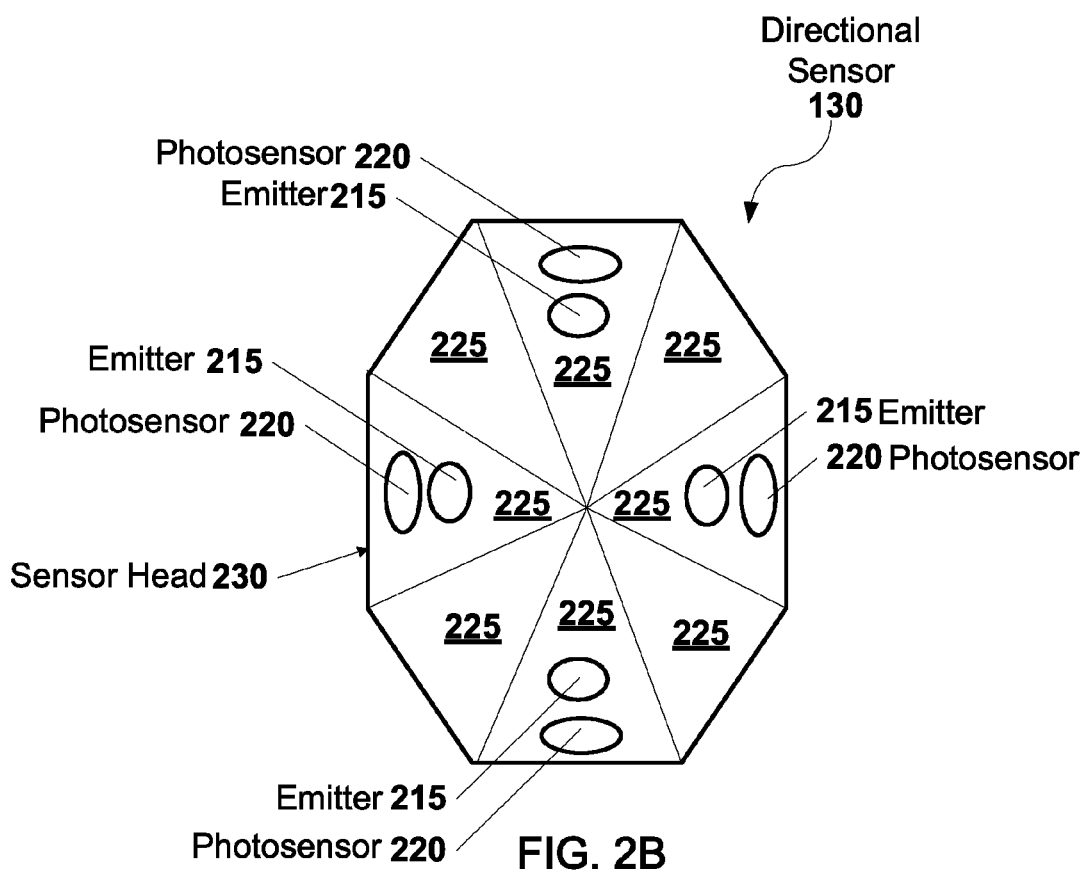
FIG. 2B illustrates an aerial view of an example of a directional sensor.

FIG. 2A and FIG. 2B illustrate two distinct views of an example of the directional sensor 130. The example of the directional sensor 130 includes eight emitters 215 and eight photosensors 220 but only four of each are shown. FIG. 2A illustrates a frontal view of the example of the directional sensor 130. FIG. 2B illustrates an aerial view of the example of the directional sensor 130.

The directional sensor 130 may include a sensor head 230 that comprises outwardly facing surfaces or facets 225. The sensor head 230 illustrated in FIGS. 2A and 2B includes eight facets 225 and only shows detail in four of the eight facets 225. Although depicted as having an octagonal shape with eight facets 225 in FIGS. 2A and 2B, the sensor head 230 may instead be shaped in the form of a dome, a round cylinder, a flat-sided cylinder, or any other shape that has surfaces facing in multiple directions from which light may be sensed. The directional sensor 130 may comprise any number of facets 225. The facets 225 and their angular coverage may partially or fully span the sensor head 230 in azimuth angle, as shown in FIGS. 2A and 2B, and/or in elevation angle. For example, spanning the entire azimuth circle with three or more facets facilitates the directional sensor 130 being installed in the lighting area 140 in any orientation in azimuth and still operating properly. Spanning the entire azimuth circle and half the elevation circle with a total of four or more facets provides hemispherical coverage and facilitates the directional sensor 130 being installed in the lighting area 140 facing outward from a surface having any orientation in azimuth and elevation. Spanning the entire azimuth and elevation circles with five or more facets provides spherical coverage and facilitates the directional sensor 130 being installed in the lighting area 140 in any orientation and/or position.

The directional sensor 130 may include the photosensors 220. Each one of the photosensors 220 may be coupled to a corresponding one of the facets 225 of the directional sensor 130. By coupling the photosensor 220 to the facet 225, the photosensor 220 may receive light from a predetermined field of view. Each one of the photosensors 220 may be any type of light sensing device. The light may be visible, or invisible, such as infrared.

The directional sensor 130 may include one or more of the emitters 215. Alternatively, the directional sensor 130 may not include any of the emitters 215. Each one of the emitters 215 may be any type of light source. The emitters 215 may be directional or omni-directional. Although the emitters 215 illustrated in FIGS. 2A and 2B are included in the directional sensor 130, the emitters 215 may be included in the light fixture 120, the directional sensor 130, a directional emitter device, any other type of device, or any combination thereof. More generally, the emitters 215 may be associated with the light fixtures 120, with the directional sensors 130, or with any type of fixture. When the emitter 215 is associated with a device, such as with the light fixture 120, the emitter may be included in the device, be positioned adjacent to or near (for example, within a predetermined distance of) the device, be co-located with the device, or any combination thereof. For example, the emitters 215 may be co-located with the directional sensor 130. If the emitter 215 is included in the directional sensor 130, determining the position of the directional sensor 130 may also determine the position of the emitter 215, and vice versa.

In the example illustrated in FIGS. 2A and 2B, each one of the emitters 215 may be coupled to a corresponding one of the facets 225 of the directional sensor 130. By coupling the emitter 215 to the facet 225, the emitter 215 may generate light in a predetermined field of view. In a second example, the emitters 215 may be coupled to the sensor head 230 but not to the facets 225, such as a single omni-directional emitter 215 at a tip of the sensor head 230. In a third example, the emitters 215 may be included in a directional emitter device that includes an emitter head that includes facets like the sensor head 230. The directional emitter device may be positioned adjacent to or near (for example, within a predetermined distance of) a corresponding one of the directional sensors 130 or a corresponding one of the light fixtures 120. In a third example, the emitter 215 may include the lamp or lamps (for example, a set of LEDs capable of emitting visible white light) in the light fixture 120. If the emitter 215 is included in the light fixture 120, determining the position of the light fixture 120 may also determine the position of the emitter 215, and vice versa. In a fourth example, the directional sensor 130 may be included in the light fixture 120, where the light fixture 120 serves as a light source for the lighting area 140, as the emitter 215, and as the directional sensor 130. When the directional sensor 130 is included in the light fixture 120, determining the position of the directional sensor 130 also may determine the position of the light fixture 120, and vice versa. In a fifth example, the directional sensor 130 may be positioned adjacent to or near (for example, within a predetermined distance) a corresponding one of the light fixtures 120, where the light fixture 120 and the associated directional sensor 130 operate as the emitter 215 and directional sensor 130, respectively, but the position of the light fixture 120 and the position of the associated directional sensor 130 may be considered the same position.

In one example, each one of the emitters 215 and each one of the photosensors 220 are coupled to a corresponding one of the facets 225 of the directional sensor 130. Alternatively, each of the facets 225 of the directional sensor 130 may include the emitter 215 or the photosensor 220, but not both. A subset of the facets 225 may, for example, include neither the emitter 215 nor the photosensor 220. In a second example, the directional sensor 130 may have three facets 225 each of which is coupled to a corresponding one of three photosensors 220, but the emitters 215 are coupled to the sensor head 230, not to the facets 225. For example, the emitters 215 may be arranged in a ring around the sensor head 230. Alternatively or in addition, the sensor head 230 may include a single omni-directional emitter 215, such as at the tip of the sensor head 230. In a third example, the directional sensor 130 may have three facets 225, where each one of the facets 225 is coupled to a corresponding one of three photosensors 220, and none of the emitters 215 is coupled to the directional sensor 130. Instead, the lamp(s) of a co-located light fixture 120, for example, may serve as the emitter 215 for the directional sensor 130. Alternatively, the sensor 130 may be a non-directional sensor that is configured to receive light from one or more of the directional emitter devices.

The power device 110 may control the emitters 215 or the emitter 215 that is associated with a fixture, such as the light fixture 120, the directional sensor 130, the directional emitter device, a non-directional emitter device, or any other type of device in the lighting system 100. In one example, the power device 110 may individually control each one of the emitters 215 associated with the fixture. In a second example, the power device 110 may control all of the emitters 215 associated with the fixture as group. In a third example, the power device 110 may control just one emitter 215 that is associated with the fixture when only one emitter 215 is associated with the device. The power device 110 may control each of the emitters 215 in the system 100 individually. For example, the power device 110 may turn off, turn on, dim, and change the modulation frequency or other signal characteristic of any of the emitters 215 without regard to any other of the emitters 215 in the system 100. Alternatively or in addition, the power device 110 may control the emitters 215 in the system 100 by the associated fixture, in groups within the associated fixture, and/or in groups across the fixtures.

Each one of the emitters 215 may have a corresponding I/O port at the power device 110. Alternatively or in addition, the power device 110 may identify each one of the emitters 215 using a corresponding emitter identifier, such as a corresponding I/O port number or any other type of identifier. The emitter identifier may identify one of the emitters 215 or a group of the emitters 215 that are controlled as a group.

Each one of the photosensors 220 may have a corresponding I/O port at the power device 110. Alternatively or in addition, the power device 110 may identify each one of the photosensors 220 using a corresponding photosensor identifier, such as a corresponding I/O port number or any other type of identifier. The photosensor identifier may identify one of the photosensors 220 or a group of the photosensors 220 that are controlled or operated as a group.

Each one of the photosensors 220 of the directional sensor 130 may provide a direction of a light signal received from one or more of the emitters 215 by the corresponding one of the photosensors 220. For example, each one of the photosensors 220 of the directional sensor 130 may measure the angular direction of the light signal received by the corresponding one of the photosensors 220. The angular direction may include one or more components, such as azimuth, elevation, or a combination thereof. Alternatively or in addition, the direction of the light signal that is received by the corresponding one of the photosensors 220 may be inherent in the shape of the directional sensor 130. For example, the facet 225 on which the photosensor 220 is located may dictate the direction from which light may be received by the photosensor 220. The direction may be an angle, a range of angles, or any other indication of direction. For example, the direction may be a facet number that identifies the facet 225 on which the photosensor 220 is located. Each one of the facets 225 of the directional sensor 130 may have a corresponding facet number or other type of facet identifier. The facet number or identifier may, therefore, indicate the direction or directions from which the light may have been received. In addition, each photosensor 220 may measure the strength or intensity of the light striking the photosensor 220. In one example, the angular direction of the light signal that is received by the directional sensor 130 may be derived from the relative strengths of the light signals received by more than one photosensor 220. For example, the angular direction may be determined by spatially interpolating the signal strengths from the photosensors 220 in two or more of the facets 225. The sensor data, such as the direction and the light intensity, may be transmitted to the power device 110.

The directional sensor 130 may be implemented in any number of ways. In one embodiment, each of the facets 225 of the sensor head 230 may be optically isolated from the other facets 225 of the sensor head 230 by an opaque divider. The dividers may determine the field of view (FOV) for each of the facets 225 and, consequently, the direction of light received by the photosensors 220 on the facets 225, and/or the direction of light transmitted by the emitters 215 on the facets 225.

In a second embodiment, the directional sensor 130 may look nothing like the example illustrated in FIGS. 2A and 2B. For example, the directional sensor 130 may include one or more of the photosensors 220 coupled to a rotation element that rotates the photosensor(s) 220 over a range of angles. The rotation element may be any device or component that rotates an object. The rotation element may include, for example, a motor, a pancake motor, an actuator, a speaker coil arrangement, or any other component capable of rotating an object. The directional sensor 130 may identify the rotational position of the photosensor(s) 220 as the photosensor(s) 220 is rotated. The direction of a light signal received by the photosensor(s) 220 may include the rotational position of the photosensor(s) 220 when the photosensor(s) 220 received the light signal.

During operation of the lighting system 100, the auto-commissioning module 170 may map the light fixtures 120 onto the site model 172. The auto-commissioning module 170 may perform the spatial commissioning in multiple phases. The auto-commissioning module 170 may perform the phases serially. Alternatively, the phases may be just logical phases, where the auto-commissioning module 170 performs the logical phases in a fragmented fashion and in an order that is different than any particular ordering of the logical phases.

In one example, spatial commissioning may be performed in four phases. A first phase, for example, may be a data gathering phase. During the data gathering phase, the system 100 may determine and record which of the photosensors 220 of each of the directional sensors 130 receives light from which of the emitters 215. The system 100 may record the corresponding directions of the light received. The system 100 may optionally obtain relative distance data that indicates the distance between the facets 225 and the emitters 215 that produce light that strikes the facets 225. Accordingly, the system 100 may obtain, from the sensor data, the direction(s) and, optionally, the distance data for each of the emitters 215 that is visible to each corresponding one of the directional sensors 130. The second phase may be a sensor graph layout phase. During the sensor graph layout phase, the system 100 may generate a graph of the emitters 215, the directional sensors 130, or a combination thereof, based on the gathered sensor data. A third phase may be a site graph layout phase. During the site graph layout phase, the system 100 may generate a second graph of the emitters 215, the directional sensors 130, or a combination thereof, from the site model 172 instead of from the sensor data. The walls 174 in the site model 172 between the emitters 215 and the photosensors 220 may be modeled so that the photosensors 220 do not receive light from the emitters 215 if the photosensors 220 are separated from the emitters 215 by one or more of the walls 174 in the site model 172. The directions and the distances between the emitters 215 and the photosensors 220 may be known or easily determined from the site model 172. The fourth phase may be a graph matching phase. During the graph matching phase, the system 100 may perform a topological graph matching algorithm to find a match between the graph generated from the sensor data and the graph generated from the site model 172. The match between the graphs may provide a mapping of the light fixtures 120 onto the site model 172. Alternatively or in addition, spatial correlation techniques tolerant of scale differences may be applied to the geometric layouts of the graphs to obtain a match between the graphs. The result is a determination of the position in the site model 172 of the light fixtures 120 and/or other types of fixtures, such as occupancy and daylight sensors, that are associated with the emitters 215 and/or the directional sensors 130.

Figure 3:
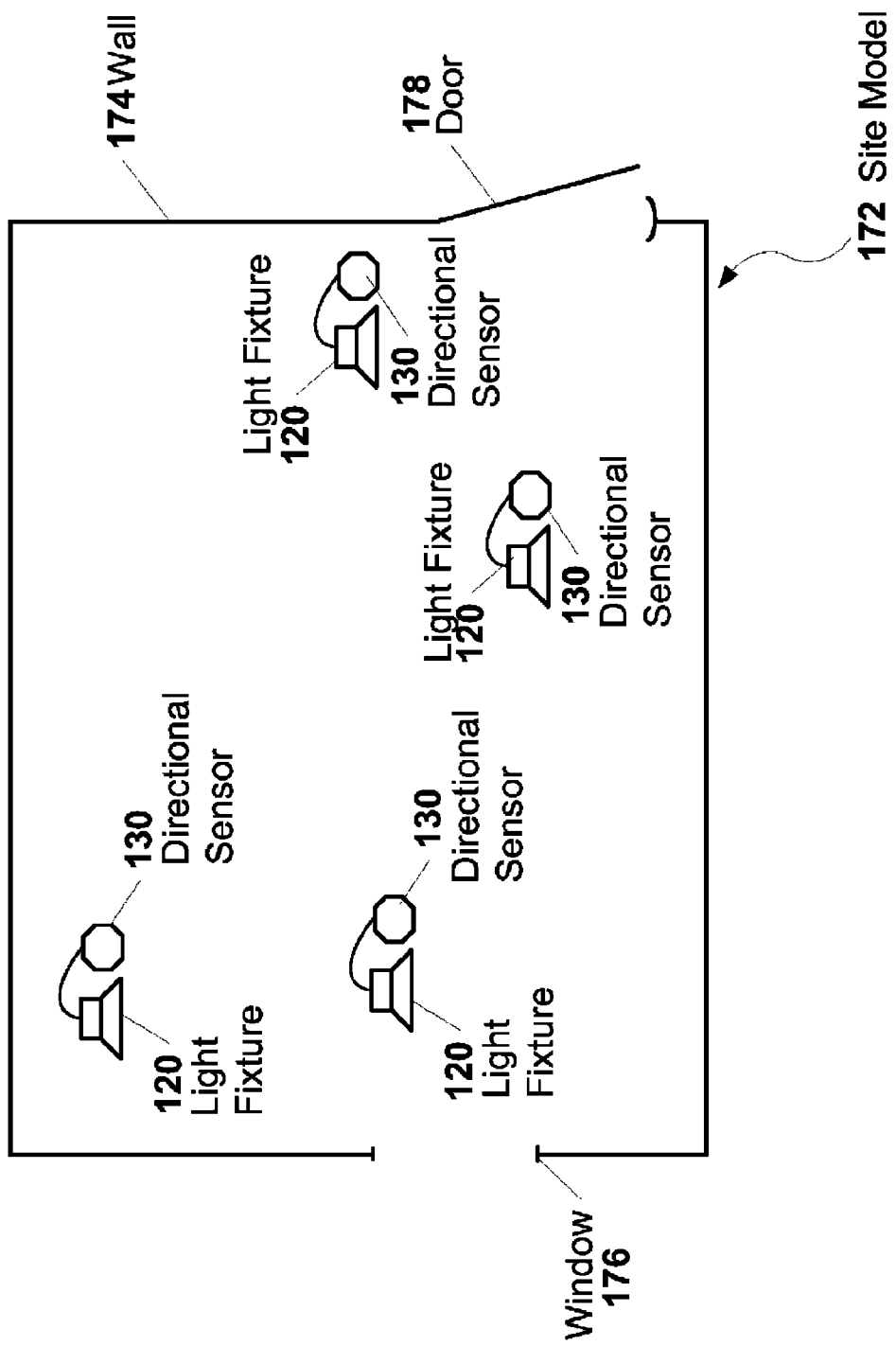
FIG. 3 illustrates an example of a site model representing a lighting system installation.

By way of example, consider the site model 172 illustrated in FIG. 3. In the example illustrated in FIG. 3, a lighting system installation includes four light fixtures 120 and four directional sensors 130. Each one of the four directional sensors 130 is co-located with a corresponding one of the four light fixtures 120. Each one of the four directional sensors 130 includes eight emitters 215 and eight photosensors 220 like the example directional sensor 130 illustrated in FIG. 2. In the example illustrated in FIG. 3, determining the position of the emitter 215 or the directional sensor 130 also determines the position of the corresponding light fixture 120.

Figure 4:
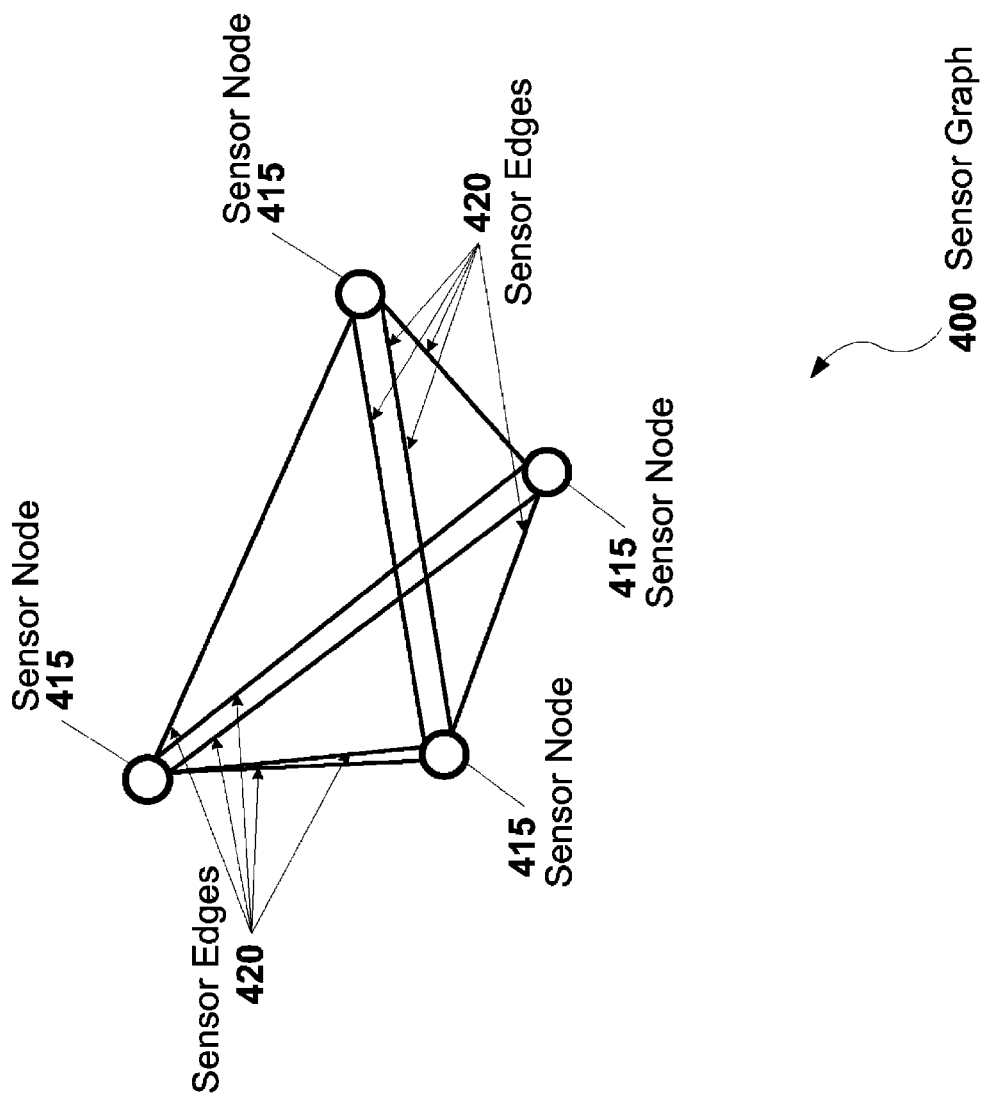
FIG. 4 illustrates an example of a sensor graph.

During the sensor graph layout phase, the auto-commissioning module 170 may generate a sensor graph 400. FIG. 4 illustrates an example of the sensor graph 400 generated by the auto-commissioning module 170 in the lighting system installation represented by the site model 172 illustrated in FIG. 3. In general, a graph may be an abstract representation of a set of objects where one or more pairs of the objects are connected by links. The interconnected objects may be represented by mathematical abstractions called vertices or nodes, and the links that connect pairs of nodes may be called edges. The edges may have a direction, a label, or any combination thereof. Any two of the nodes may be either connected by one or more edges or not connected by any edge. The graph may be illustrated in diagrammatic form as a set of circles for the nodes, joined by lines or curves for the edges, such as sensor nodes 415 and sensor edges 420, respectively, in the sensor graph 400.

The sensor graph 400 may be any graph in which objects or nodes of the graph represent the fixtures in the lighting system 100, such as the directional sensors 130 and/or the emitters 215. Each one of the sensor edges 420 may connect a corresponding pair of the sensors nodes 415. A pair of the sensor nodes 415 connected by the sensor edge 420 may represent a first and a second one of the directional sensors 130, where the emitter 215 associated with the first one of the directional sensors 130 is within the field of view of the photosensor 220 of the second one of the directional sensors 130. If any of the photosensors 220 and any of the emitters 215 of the pair of the directional sensors 130 are visible, then the sensor nodes 130 representing the directional sensors 130 in the pair may be connected by at least one of the sensor edges 420. For example, if the first directional sensor 130 receives light from the second directional sensor 130, then the direction and/or the distance detected by the first directional sensor 130 may be associated with a first sensor edge 420 that extends from the first sensor node 415 to the second sensor node 415. If the second directional sensor 130 also receives light from the first directional sensor 130, then the direction and/or the distance detected by the second directional sensor 130 may be associated with a second sensor edge 420 that extends from the second sensor node 415 to the first sensor node 415. Alternatively or in addition, if two photosensors 220 in the first directional sensor 130 receive light from one emitter 215 in the second directional sensor 130, then two sensor edges 420 may extend from the first directional sensor 130 to the second directional sensor 130, where one sensor edge 420 is created for each photosensor 220 or facet 225 that receives the light. In one example, the directional sensor 130 may be a sensor, A, that receives light from the directional emitter device, B. If the system 100 causes the emitter 215 in A to generate light that is detected by B, then the system 100 may create the sensor edge 420 between A and B. The system 100 may further include the direction of emission of the light as a constraint on the B end of the sensors edge 420, and the direction of receipt of the light as a constraint on the A end of the sensor edge 420. The system 100 may include a distance constraint in the middle of the sensor edge 420 and/or with the sensor edge 420 generally.

In order to generate the sensor graph 400 from the sensor data, the auto-commissioning module 170 may receive the sensor data from the directional sensors 130 in the data gathering phase. As indicated above, the sensor data may include the direction of light received at the photosensor 220 of one of the directional sensors 130. The sensor data may indicate an identity of one of the emitters 215 associated with a second one of the directional sensors 130 if, for example, the identity is encoded in the light received at the photosensor 220 as described later below. Alternatively or in addition, the auto-commissioning module 170 may know the identity of the emitter 215 associated with the second one of the directional sensors 130 because the auto-commissioning module 170 may cause the emitter 215 to selectively emit light. The auto-commissioning module 170 may create a corresponding one of the sensor edges 420 from the combination of (1) the direction of light received at the photosensor 220 of the determined one of the directional sensors 130, (2) the identity of the emitter 215 that emitted the light received by the determined one of the directional sensors 130, (3) the direction of light emitted by one or more of the directional emitter devices, or any combination thereof. For example, the direction of light reception, the direction of light emission, and the identities of the first and second directional sensors 130 that include the facets 225 to which the emitter 215 and the photosensor 220 involved are coupled, and/or any combination thereof, may be included in the sensor graph 400 as constraints for the sensor edge 420 between the sensor nodes 415 corresponding to the first directional sensor 130 and the second directional sensor 130.

In a first example, the auto-commissioning module 170 may determine the identity of the emitter 215 by causing only one of the emitters 215 to emit a signal at any given time. For example, the auto-commissioning module 170 may determine the identity of the emitter 215 as the identity of the emitter 215 that is emitting the signal when the photosensor 220 receives the signal. While the identified emitter 215 produces the signal, the auto-commissioning module 170 may check the photosensors 220 of the directional sensors 130 for any indication that light is received from the identified emitter 215 and for the corresponding direction of the light received. The auto-commissioning module 170 may create the sensor edges 420 extending from the sensor node 415 that represents the directional sensor 130 associated with the identified emitter 215. The sensor edges 410 may extend to the sensor nodes 415 representing the directional sensors 130 that include the photosensors 220 that received the light from the identified emitter 215. The auto-commissioning module 170 may cycle through the emitters 215 associated with the directional sensors 130 and repeat the process of creating the senor edges 420 for each of the emitters 215.

In a second example, the auto-commissioning module 170 may determine the identity of the emitter 215 if the identity of the emitter 215 is encoded in the signal generated by the emitters 215. Each of the emitters 215 may have a different emitter pulse frequency than the other emitters 215. Alternatively, the light from each respective one of the emitters 215 may have some other distinctive feature that distinguishes the light produced by the emitters 215. The auto-commissioning module 170 may determine which of the emitters 215 is emitting the light received at the facet 225 from the signal received at the photosensor 220 coupled to the facet 225. In such an example, all of the emitters 215 in the lighting system 100 may produce light at the same time, and the auto-commissioning module 170 may determine which of the emitters 215 produced the light received by a determined one of the photosensors 220. Accordingly, the directional sensor 130 may differentiate light from, and identify, multiple emitters 215 that emit light detected by one of the photosensors 220, even if the emitters 215 are from multiple directional sensors 130 and emit light at the same time as the other emitters 215.

The auto-commissioning module 170 may determine an estimated distance between any of the emitters 215 and the photosensor 220 that received light from the emitters 215 based on the sensor data. The auto-commissioning module 170 may include a constraint for each of the sensor edges 420 that is based on the estimated distance from the emitter 215 to the photosensor 220. Determining the estimated distances and including corresponding constraints for the sensors edges 420 based on the estimated distances may be optional.

The estimated distance between the emitter 215 and the photosensor 220 may be derived from the light intensity detected by the photosensor 220 of the light produced by the emitter 215. The sensor data may include an indication of the light intensity. The auto-commissioning module 170 may determine the estimated distance based on the light intensity—the higher the light intensity, the closer the emitter 215 and the photosensor 220 may be to each other. A weight may be included with the estimated distance constraint that corresponds to a confidence in the accuracy of the estimated distance. For example, the constraints corresponding to the estimated distances may be strong if the distances are calibrated, and weak if the distances are not calibrated. For example, the distance measurements may be calibrated by manually identifying the location of any pair of the directional sensors 130 and measuring the actual distance between the directional sensors 130. A calibration factor may be determined that converts light intensity measurements taken at the identified directional sensors 130 to the actual distance. The calibration factor may be used to determine more precise distance measurements between the remaining directional sensors 130.

Alternatively or in addition, the estimated distance between pairs of emitters 215 and photosensors 220 may be resolved from mutual triangulation. The direction information received in the sensor data from the directional sensors 130 may indicate the measure of angles of a triangle formed such that the vertices of the triangle are located at the directional sensors 130. The auto-commissioning module 170 may determine the estimated distance from the light intensity measurements combined with the triangulation information from the directional sensors 130 more accurately than from the light intensity measurements alone.

Any sub-graph comprising three of the sensor nodes 415 may form a sensor triangle that partially models the physical layout of the directional sensors 130 represented by the sensor nodes 415 in the sensor triangle. If all of the directional sensors 130 in the lighting system 100 are members of at least one such sensor triangle, then the sensor graph 400 may fully model a physical layout of the entire set of directional sensors 130.

As described earlier, the lamp of the light fixture 120 may serve as the emitter 215 to the co-located or adjacent directional sensor 130. For purposes of generating the sensor graph 400, the light fixture 120 may be described as being associated with the co-located or adjacent directional sensor 130, and the light fixture 120 may be treated as one of the directional sensors 130 that includes the emitter 215. Accordingly, the light fixture 120 may be represented as one of the sensor nodes 415 on the sensor graph 400. Alternatively, the light fixture 120 may be treated as the light fixture 120 and not the directional sensor 130, and be represented as one of the sensor nodes 415 on the sensor graph 400 that is different than one of the sensor nodes 415 that represents the directional sensor 130.

Figure 5:
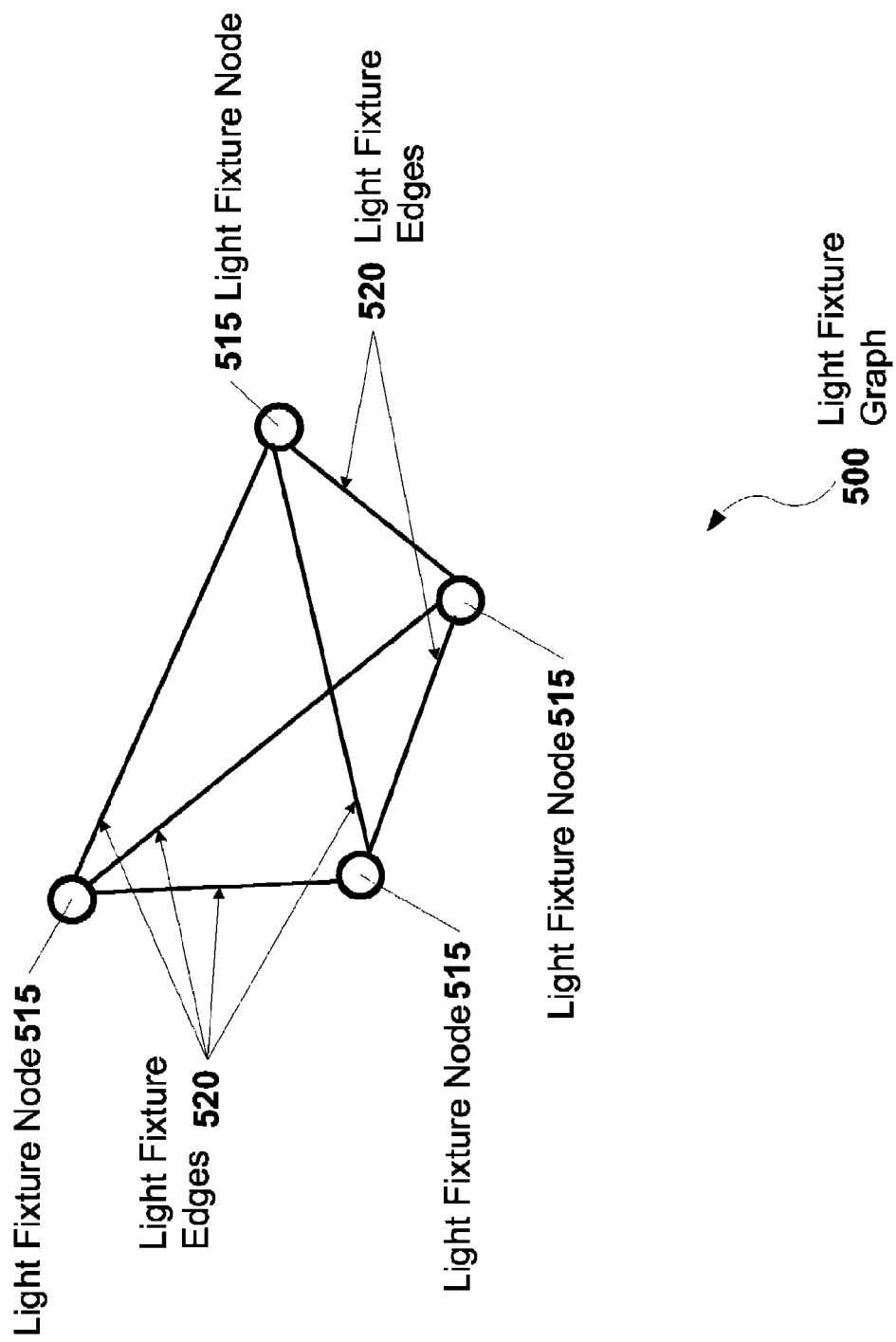
FIG. 5 illustrates an example of a light fixture graph.

Alternatively or in addition, the auto-commissioning module 170 may locate the light fixtures 120 relative to the directional sensors 130 and construct a light fixture graph 500. FIG. 5 illustrates an example of the light fixture graph 500 in the lighting system installation represented by the site model 172 illustrated in FIG. 3. The light fixture graph 500 may be any graph in which objects or nodes of the graph represent the light fixtures 120. In particular, the light fixtures 120 may be represented by light fixture nodes 515. A light fixture edge 520 may connect any two of the light fixture nodes 515 that represent two of the light fixtures 120 that illuminate a common lighting area 140. The directional sensors 130 may measure the direction of the light fixtures 120 relative to the directional sensors 130. The auto-commissioning module 170 may estimate the position of the light fixtures 120 relative to the directional sensors 130. The auto-commissioning module 170 may determine the direction(s) and the estimated distance between any two of the light fixtures 120 relative to each other based on triangulation, where one of the directional sensors 130 and the two light fixtures 120 form the vertices of a triangle. The directions, and optionally the distances, between pairs of the light fixture nodes 515 may be constraints for the connecting light fixture edges 520.

In the site graph layout phase, the auto-commissioning module 170 may generate a site graph from the site model 172. The site graph may be any graph generated from the site model 172 in which the objects or the nodes of the graph represent the directional sensors 130, the light fixtures 120, the directional emitter devices, or any other type of fixture in the lighting system 100. In other words, the site graph 600 may be like a second sensor graph 400 and/or a second light fixture graph 500 that is generated from the site model 172 instead of from the sensor data.

Figure 6:
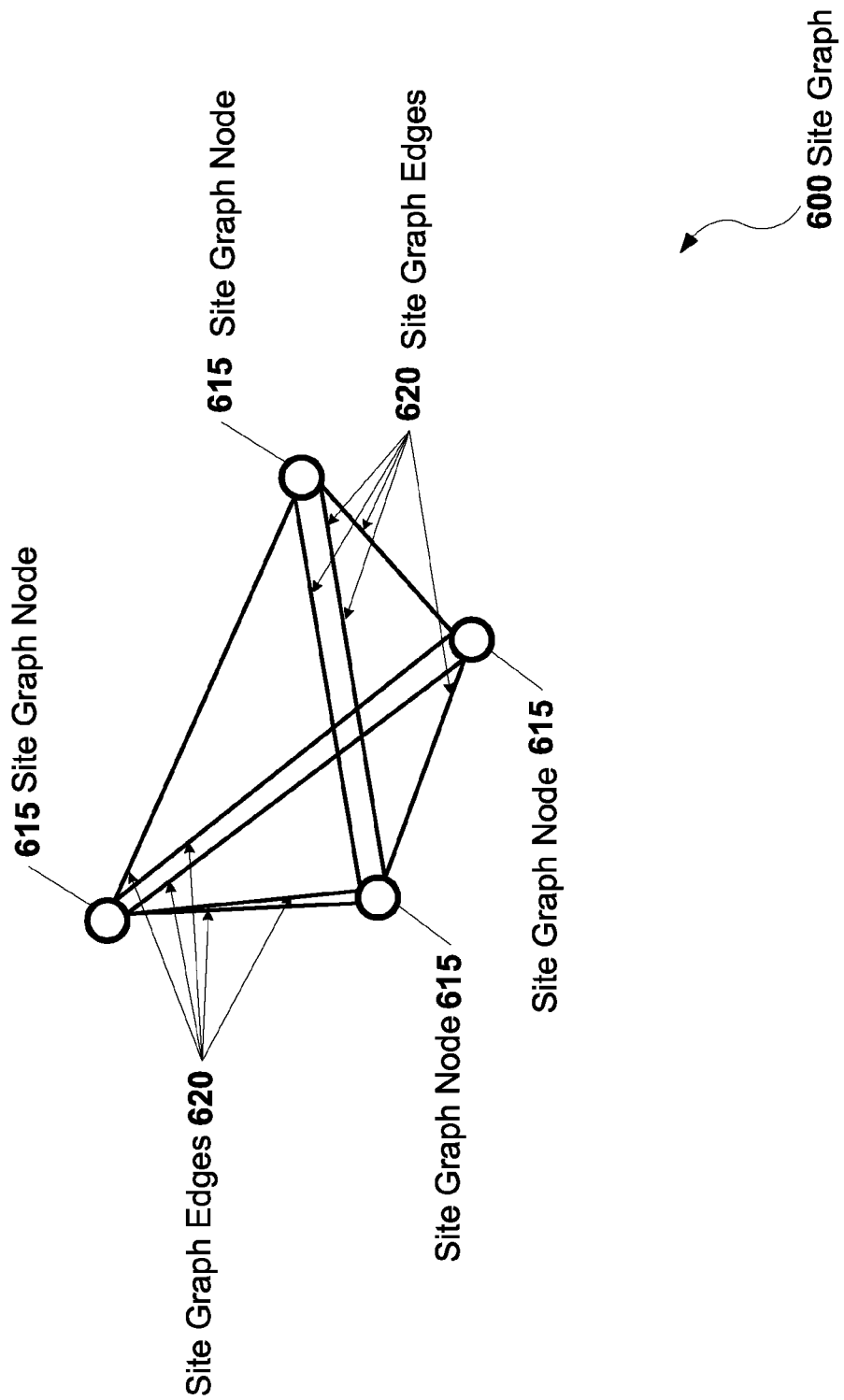
FIG. 6 illustrates an example of a site graph.

FIG. 6 illustrates an example of a site graph 600 that is generated from the site model 172 of FIG. 3. Site graph nodes 615 may represent the directional sensors 130, and/or any other type of fixture. Each site graph edge 620 may connect a corresponding pair of the site graph nodes 615. A pair of the site graph nodes 615 that are connected by the site graph edge 620 may, for example, represent a first and a second one of the directional sensors 130, where the emitter 215 associated with the first one of the directional sensors 130 is within the field of view of the photosensor 220 of the second one of the directional sensors 130 according to the site model 172. For example, the auto-commissioning module 170 may determine that the emitters 215 and/or the light fixtures 120 are not in the field of view of one of the photosensors 220 if any of the walls 174 separate the photosensor 220 from the emitters 215 or the light fixtures 120 in the site model 172. The auto-commissioning module 170 may determine the direction or directions between any pair of the directional sensors 130 from the positions of the directional sensors 130 in the site model 172. In addition, the auto-commissioning module 170 may determine the distance between any pair of the directional sensors 130 from the positions of the directional sensors 130 in the site model 172.

In the graph matching phase, the auto-commissioning module 170 may determine a match between the sensor graph 400 and the site graph 600, between the light fixture graph 500 and the site graph 600, or any combination thereof. If the actual installation of the light fixtures 120 and the directional sensors 130 matches the site model 172, then the sensor graph 400 will match the site graph 600, the light fixture graph 500 may match the site graph 600, or any combination thereof.

In one example, the auto-commissioning module 170 may perform any known graph matching algorithm to find a match between the site graph 600 generated from the site model 172 and the sensor graph 400 and/or the light fixture graph 500 generated from the directions detected by the directional sensors 130. In a second example, simple spatial correlation techniques may be used in lieu of more sophisticated graph matching techniques in order to find the match between the site graph 600 and the sensor graph 400 and/or the light fixture graph 500.

One approach to matching graphs is to generate a graph layout for each of the graphs and then match the graph layouts. A graph layout may be a transformation of a graph into two or three dimensions. The transformation may determine the distance and relative orientation of each of the pairs of nodes of the graph based on the constraint(s) and/or weight(s) assigned to each edge.

Many techniques exist for generating graph layouts from graphs. One such technique is a modified force-directed technique. For example, if the relative positions of the directional sensors 130 are not known in the site model 172, then the auto-commissioning module 170 may generate a two-dimensional graph layout from the sensor graph 400 using the modified force-directed technique. The resulting graph layout may be an estimate of a spatial topology of the directional sensors 130. Force-based algorithms are a class of algorithms for constructing graph layouts by positioning the nodes of a graph in a two or three dimensional space so that the edges of the graph are of substantially equal length and the number of crossing edges are limited and/or eliminated. Unlike a traditional force directed algorithm, which focuses on topology, the addition of spatial constraints (the directions and, optionally, the distances) may result in a spatially accurate, although not yet oriented, graph layout.

The force-directed algorithms achieve such a result by assigning forces amongst the set of edges and the set of nodes. The auto-commissioning module 170 may, in one such force-directed algorithm, assign forces among the nodes and the edges based on the constraints associated with the edges. The forces may be treated as forces in a system in which the edges are springs (see Hooke's law) or the nodes are electrically charged particles (see Coulomb's law). The entire graph may then be simulated as if the graph were a physical system. The forces are applied to the nodes, pulling the nodes closer together or pushing the nodes further apart. Similarly, analogous forces may be applied to achieve angular constraints on edge direction, and limiting forces on edge length may satisfy any distance constraints. The auto-commissioning module 170 may iteratively simulate such a physical system until the simulated physical system comes to an equilibrium state. The auto-commissioning module 170 may determine that the equilibrium state is reached by, for example, determining that the relative positions of the nodes do not change from one iteration to the next iteration. The physical interpretation of such an equilibrium state is that all of the forces are in mechanical equilibrium. The simulated physical system in equilibrium may represent the graph layout. In addition, the force-directed graph layout of the sensor graph 400 may correspond to a physical layout of the directional sensors 130, the light fixtures 120, and/or any other type of fixture described by the site model 172.

A common issue with such iterative optimization (hill climbing) algorithms is that the algorithms may get stuck at local maxima or in endless cycles. Such a scenario may result in an ambiguous or incomplete graph layout. By incorporating additional constraints, such as direction of received light, direction of emitted light, distance, or a combination thereof, the likelihood of such issues occurring may be reduced.

The auto-commissioning module 170 may correlate the sensor graph 400 and the light fixture graph 500 with the site graph 600. The main difference between the as-built sensed layout (represented by the sensor graph 400 and/or the light fixture graph 500) and the as planned layout (represented by the site graph 600) may be due to rotation and/or scale, which may be resolved using pattern matching techniques, such as spatial correlation. Minor differences between the layouts may be due to deviations from the site design. Once the layouts are spatially matched, the nodes in the two layouts may correspond to each other. Accordingly, the identities of the directional sensors 130, the light fixtures 120, and/or other fixtures in the site model 172 may be assigned to the corresponding directional sensors 130, light fixtures 120, and/or other fixtures powered by, or in combination with, the power device 110.

Isolated subgraphs and discrepancies between the site model 172 as-designed and the physical site as-installed may occur. The approach described herein provides redundancy because each one of the directional sensors 130 is likely to be visible to two or more of the other directional sensors 130. Each pairing of the emitters 215 and the photosensors 220 may produce a pair of angular measurements relative to the directional sensors 130. For example, two directions may be included with each one of the sensor edges 420. The two directions for each one of the sensor edges 420 may be considered two constraints per sensor edge 420. In addition, each directional sensor 130 that is mutually visible to two other directional sensors 130 may provide redundant constraints on distance and location. With such redundancy, the issue of graph matching is likely to be over-specified in the lighting system 100. The redundancy facilitates identifying and isolating differences between the site model 172 and the actual physical site. Accordingly, the redundancy may further increase the accuracy of the resulting locations of the directional sensors 130 and/or light fixtures 120.

A subgraph may be any subset of the nodes of a graph, such as a subset of the nodes of the sensor graph 400 or the light fixture graph 500. An isolated subgraph may be a subgraph that includes one or more nodes that are not paired with any other nodes in the graph. Isolated subgraphs, which may represent the fixture or the fixtures in a walled office, a conference room, or a lobby, may be more difficult to correlate within the site model 172 if the isolated subgraphs appear identical to each other. For example, a pair of offices, which are the identical size, the identical shape, and include an identical number of the directional sensors 130 that are installed in the identical relative position(s) within the office, may have isolated subgraphs that appear identical to each other. If, however, the geometry of a subgraph is sufficiently unique, then the subgraph may be correlated with, and located within, a correspondingly unique portion of the site model 172 by the auto-commissioning module 170.

In some examples, the auto-commissioning module 170 may not be able to correlate all of the subgraphs without more information than the information provided by the sensor graph 400, the light fixture graph 500, and the site graph 600. Such information may be obtained passively by the auto-commissioning module 170 in the form of daylighting, motion, and/or other information that may be gathered by the auto-commissioning module 170 during normal operation of the lighting system 100.

One example of such additional passive information is daylight information. Daylight information may include any information related to sunlight. The amount of daylight in any of the lighting areas 140 may be measured by one or more daylight sensors in the lighting area 140. The daylight sensors may be different from the directional sensors 130. Alternatively, the directional sensors 130 may serve as the daylight sensors, where the photosensors 220 of the directional sensors 130 detect daylight as well as light from the emitters 215. In one example, the directional sensor 130 may include a filter used to isolate the daylight received by the photosensor 220 from light received from other light sources, such as the emitters 215. Alternatively or in addition, the directional sensor 130 may detect the amount of daylight received by the directional sensor 130 when the light fixtures 120 in the lighting area 140 are not producing light. The amount of daylight received by the directional sensors 130 may be correlated with a time of day, a day of year, a site location, an orientation of the lighting areas 140 in the site model 172, or any combination thereof. The correlation may provide an indication of where a subgraph may be located and how the subgraph may be oriented. In the northern hemisphere, daylight detected by any one of the directional sensors 130 that is in one of the lighting areas 140 that has a window facing south may be stronger than in one of the lighting areas 140 that has a window facing north. Any one of the directional sensors 130 that is in one of the lighting areas 140 that has a window facing east may detect more daylight in the morning hours than in the evening hours. Conversely, any one of the directional sensors 130 that is in one of the lighting areas 140 that has a window facing west may detect less daylight in the morning hours than in the evening hours. The directional sensors 130 that are closer to the window 176 may receive more daylight than the directional sensors 130 that are farther from the window.

In a second example, the directional sensors 130 may include or be associated with motion detectors or occupancy sensors that provide useful additional information. The auto-commissioning module 170 may correlate motion detected by the directional sensors 130 with the location of the doors 178 and/or pathways in the site model 172. For example, the directional sensors 130 that are located closer to the doors 178 and/or pathways may detect more motion than the directional sensors 130 that are further away. Alternatively or in addition, the system 100 may track the motion of occupants moving from a first lighting area 140 to a second lighting area 140, where the fixtures in the first lighting area 140 have been mapped to the site model 172 by the auto-commissioning module 170, but the fixtures of the second lighting area 140 have not been mapped to the site graph 172, because the sensor graph 400 and/or the light fixture graph 500 contains isolated or ambiguous subgraphs. By correlating such motion in space and time, the auto-commissioning module 170 may identify and/or map the fixtures of the second lighting area 140.

In a third example, the directional sensors 130 may include or be associated with temperature sensors that provide useful additional information. The auto-commissioning module 170 may correlate temperature information from the directional sensors 130 with the location of HVAC vents, and outside doorways and walls in the site model 172. For example, the directional sensors 130 that are located closer to known heat sources may detect more heat than the directional sensors 130 that are further away. Alternatively or in addition, the directional sensors 130 that are located closer to known heat sources may detect a heat pattern that correlates to a known pattern of heat production by the known heat sources.

Alternatively or in addition, active information may be useful in locating isolated subgraphs within the site model 172. Active information may be provided by commissioning personnel, either by direct input to the auto-commissioning module 170 via a commissioning Graphical User Interface (GUI), or via indirect manual methods involving light wands and or other devices in the proximity of the directional sensors 130. For example, U.S. Patent Application Publication 20110199004 A1, filed Feb. 11, 2011, entitled "COMMISSIONING LIGHTING SYSTEMS," describes a pointing device capable of emitting or returning a signal. The auto-commissioning module 170 described herein may reduce or even eliminate the amount of active information that personnel must provide in order to determine which light fixture 120 controlled by the power device 110 corresponds to which light fixture 120 in the site model 172. In one example, only one node in each subgraph may need to be manually located, and the auto-commissioning module 170 may correlate the rest of the subgraph nodes within the site model 172, as supplemented by, or confirmed through, passively gathered information. In a second example, no nodes or more than one node needs to be manually located.

Once the spatial commissioning process is complete, the output level of the individual light fixtures 120 may, for example, be controlled by the power device 110 in accordance with the site model 172. The output level of the individual light fixtures 120 may then be switched on and off or dimmed without regard to the other light fixtures 120 in the lighting area 140.

In another example, the output level of a group of the light fixtures 120 may be controlled by the power device 110. Such groups may be defined according to the needs of an installation. Grouping the light fixtures 120 by the lighting area 140 that the light fixtures 120 illuminate may be desirable. For example, the light fixtures 120 that illuminate a corresponding one of the lighting areas 140 may be grouped together. Thereafter, the light fixtures 120 in each group may be controlled as group. For example, all of the light fixtures 120 in one group may be turned off if no person is detected in the lighting area 140 illuminated by the light fixtures 120 in the one group.

For a building in which walls divide a floor into relatively small rooms, the auto-commissioning module 170 may assign groups by identifying the light fixtures 120 that are connected in a sub-graph and assign the identified light fixtures 120 to a room group. The light fixtures 120 in that group may be switched on and off together or dimmed together or configured to respond as a group to motion sensors or daylight sensors. For installations with larger rooms or large open spaces, the auto-commissioning module 170 may define groups that are smaller than the entire contiguous space of the larger rooms or the large open spaces. For example, a group may be defined for the front and back sections of a conference room, or for different work areas in an open floor plan. For other applications, a group may be defined to cover an entire contiguous space, with an arbitrarily large number of the light fixtures 120. Depending on the embodiment, a variety of algorithms may be used to create groups. Groups may be created such that each light fixture 120 is assigned to a single group, or alternatively, single light fixtures 120 may be assigned to multiple groups. In yet another example, the light fixtures 120 may not be assigned to groups. Instead, each of the light fixtures 120 may be controlled independently and according to sensed daylight, occupancy, user inputs, energy usage, and/or any other such data that may be applicable to the lighting area 140 or to the lighting system 100 as a whole.

The lighting system 100 may include more, fewer, or different components than illustrated in FIG. 1. For example, the lighting system 100 may include any number of the light fixtures 120 and any number of the directional sensors 130. The lighting system 100 may include any number of the lighting areas 140. The lighting system 100 may include different components, such as input devices, output devices, or the directional emitter devices. Examples of input devices include switches, keyboards, and touchscreens. Examples of output devices include a display, and a computer screen.

The lighting system 100 may include multiple power devices 110. The power devices 110 may communicate with each other over a network. For example, the power devices 110 may coordinate with each other over the network in order to perform auto-commissioning of the entire lighting system 100. The network may include a local area network (LAN), a wireless local area network (WLAN), a personal area network (PAN), a wide area network (WAN), the Internet, a packet switched network, or any other now known or later developed communications network, or any combination thereof.

The directional sensors 130 are described above as performing a variety of operations, such as communicating with the power device 110. Alternatively or in addition, the same operations may be performed in whole or in part by a circuit external to the directional sensor 130, such as an adapter circuit. For example, the adapter circuit may include a communication circuit that communicates with the power device 110. The adapter circuit may receive the sensor data from the directional sensor 130, and transmit the sensor data with the communication circuit to the power device 110.

In one example, the adapter circuit, instead of the directional sensor 130, may be electrically coupled to the wiring 150 that powers a corresponding one of the light fixtures 120. The power device 110 may provide power to the directional sensor 130 via the adapter circuit. Alternatively or in addition, the directional sensor 130 may be powered from some other source.

The lighting system 100 may not have a one to one correspondence between the light fixtures 120 and the directional sensors 130. The number of the directional sensors 130 may be different than the number of the light fixtures 120. One or more of the directional sensors 130 may be electrically coupled to the power device 110 via wiring 150 that is separate from the wiring 150 that electrically couples the light fixtures 120 to the power device 110.

The communication between the power device 110 and the directional sensor 130 may involve any protocol, proprietary or standard. The communication may be over the wiring 150 illustrated in FIG. 1 or over any other communications network.

The power device 110 is described above as performing a variety of operations. Alternatively or in addition, the same operations may be performed in whole or in part by a control device instead of the power device 110. Examples of the control device include a computing device, a computer, a laptop, a smart phone, a server, an integrated circuit, or any other suitable device.

The auto-commissioning module 170 is described above as performing a variety of operations. Alternatively or in addition, the same operations may be performed in whole or in part by different modules. The auto-commissioning module 170 may comprise modules, such as a data gathering module for performing the data gathering phase, a sensor graph layout module for performing the sensor graph layout phase, a site graph layout module for performing the site graph layout phase, and a graph matching module for performing the graph matching phase.

Figure 7:
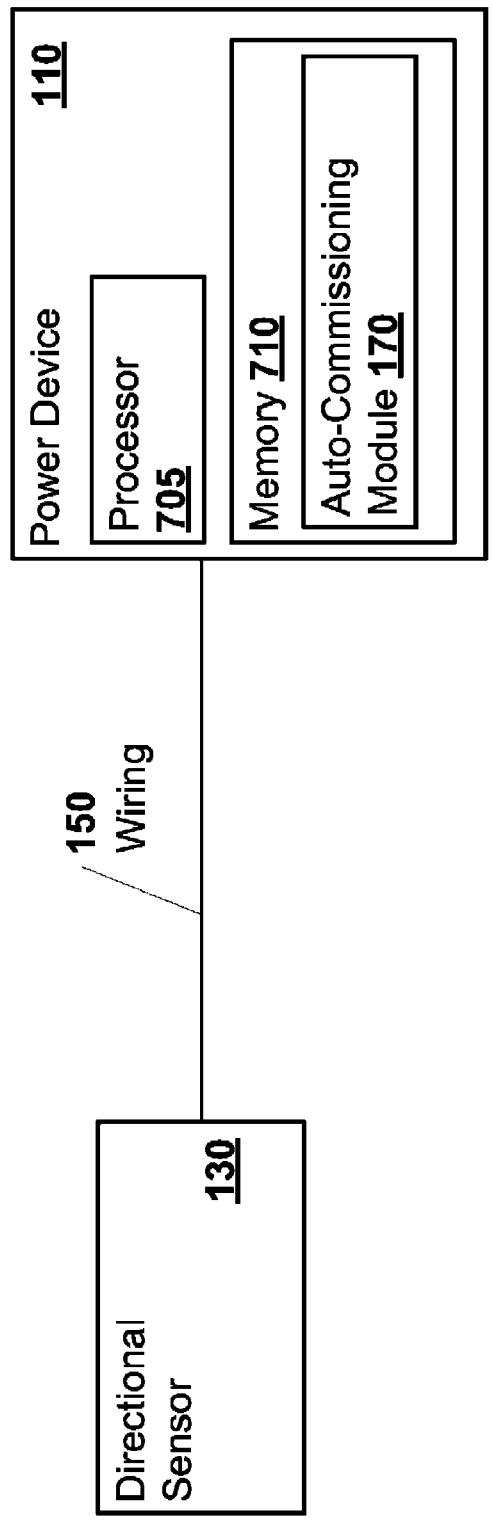
FIG. 7 illustrates an example of a power device and a directional sensor.

FIG. 7 illustrates an example of the power device 110 and one of the directional sensors 140. The power device 110 may include a processor 705 and a memory 710. The memory 710 may hold the programs and processes that implement the logic described above for execution with the processor 705. As examples, the memory 710 may store program logic that implements the auto-commissioning module 170, or another part of the system 100. As described above, the auto-commissioning module 170 may receive the angle and the light intensity measurements relating to the light fixtures 120 and/or the directional sensors 130 from the directional sensors 130 and map the light fixtures 120 onto the site model 172.

The memory 710 may be any now known, or later discovered, device for storing and retrieving data or any combination thereof. The memory 710 may include non-volatile and/or volatile memory, such as a random access memory (RAM), a read-only memory (ROM), an erasable programmable read-only memory (EPROM), or flash memory. Alternatively or in addition, the memory 710 may include an optical, magnetic (hard-drive) or any other form of data storage device.

The processor 705 may be one or more devices operable to execute computer executable instructions or computer code embodied in the memory 710 or in other memory to perform the features of the system 100. The computer code may include instructions executable with the processor 705. The computer code may be written in any computer language now known or later discovered, such as C++, C#, Java, Pascal, Visual Basic, Perl, HyperText Markup Language (HTML), JavaScript, assembly language, shell script, or any combination thereof. The computer code may include source code and/or compiled code.

The processor 705 may be in communication with the memory 710. The processor 705 may also be in communication with additional components, such as the directional sensors 130. The processor 705 may include a general processor, a central processing unit, a server device, an application specific integrated circuit (ASIC), a digital signal processor, a field programmable gate array (FPGA), a digital circuit, an analog circuit, a microcontroller, any other type of processor, or any combination thereof. The processor 705 may include one or more elements operable to execute computer executable instructions or computer code embodied in the memory 710 or in other memory that implement the features of the system 100. The memory 710 may include data structures used by the computer code.

The directional sensor 130 may include additional, fewer, or different components. For example, the directional sensor 130 may include the rotation element, one or more sensing elements, and one or more lenses. The directional sensor 130 may not include the multiple facets 225 that limit the field of view of the photosensors 220.

The directional sensor 130 may include a processor and a memory, such as the processor 705 and the memory 710 included in the power device 110. The processor in the directional sensor 130 may perform all or a portion of the logic in the system 100.

The directional sensor 130 may include, for example, communication circuitry that communicates with the power device 110. For example, the directional sensors 130 may be distributed over a network.

As described above, the lighting system 100 may include a system for spatial commissioning of the lighting system 100. The system for spatial commissioning may include the photosensors 220 and the emitters 215. Each light fixture 120, sensor (such as the directional sensor 130), emitter device, or any other fixture of interest in the lighting system 100 whose position is to be discovered, may be co-located with or include at least one of the photosensors 220 or the emitters 215. By the fixture of interest including, or being co-locating with, at least one of the photosensors 220 or the emitters 215, a determination of the position of the photosensors 220 and/or the emitters 215 may also be a determination of the position of the fixture of interest.

The system for spatial commissioning may include additional, different, or fewer components. For example, additional sensors and emitters that are not co-located with the fixtures of interest may be included in the commissioning system. The system for spatial commissioning may include one or more of the power devices 110, the auto-commissioning module 170, any other type of component, or any combination thereof. For example, the system for spatial commissioning may include only the auto-commissioning module 170.

The sensor may sense a light signal generated by any of the emitters 215. The sensor may sense the direction of the emitter 215, the distance to the emitter 215, the identity of the emitter 215, or any combination thereof. The emitter 215 may emit light in a known direction, such as when the emitter 215 is coupled to a directional emitter device. Alternatively, the emitter 215 may emit light in many or in all directions, such as if the emitter 215 is coupled to the tip of the directional sensor 130. In such a case, the sensor may be directional, and the emitter device may not be directional. The emitter 215 may emit light with a signature that identifies the source of the light, or that differentiates one emitter 215 from another light source or that differentiates a group of the emitters 215 from another group of the emitters 215.

A sensor device may be any device or combination of devices that detects light emitted by a light source. The sensor device may include one or more of the photosensors 220. The photosensors 220 may be coupled to the facets 225 of the directional sensor 130 or to some other optical partitioning, coupling, or mapping that facilitates direction awareness. For example, the sensor device may include the directional sensor 130. Alternatively, each one of the photosensors 220 may detect light in all or in substantially all directions, such as if the photosensor 220 is coupled to the tip of the sensor 130. In such a case, the emitter device may be directional, but the sensor may not be directional.

An emitter device may be any device or combination of devices that emits light. The emitter device may include one or more of the emitters 215, which may be coupled to the facets 225 or some other optical partitioning, coupling, or mapping that facilitates direction awareness. The emitter device may be included in or include the sensor device, or be a physically discrete device separate from the sensor device. In one example, the emitter device may be included in the sensor device, such as in the directional sensor 130. Alternatively or in addition, the emitter device may be included in the directional emitter device. The light fixture 120, as a light generating device, may serve as the emitter device. The emitter device may include a processor and a memory, such as the processor 705 and the memory 710 included in the power device 110 or the processor and the memory included in the sensor device. The emitter device may include additional, fewer, or different components. For example, the emitter device may include or be in communication with the adapter circuit that communicates with the power device 110.

The system for spatial commissioning may perform spatial commissioning using any number of ways. In one example, the sensors may be directional, but the emitter devices may not be directional. The system 100 may construct the sensor graph 400 such that each sensor node 415 in a first set of the sensor nodes 415 represents a corresponding one of the sensors regardless of whether the sensors represented in the first set of the sensor nodes 415 are associated with fixtures of interest. The system 100 may further construct the sensor graph 400 such that each sensor node 415 in a second set of the sensor nodes 415 represents the emitters devices that include any of the emitters 215 detected by the sensors represented by the first set of the sensor nodes 415. Each one of the sensor edges 420 may connect two corresponding sensor nodes 415 representing one of the sensors and one of the emitter devices, respectively, where the sensor detected light received from the emitter device. A particular emitter device may be detected by a particular sensor if one or more emitters 215 included in the particular emitter device are visible to one or more of the photosensors 220 included in the particular sensor. The system 100 may associate data with each one of the sensor edges 420. The data may include the direction of the emitter device and, optionally, the distance to the emitter device, from the sensor, where the emitter device and the sensor are represented by the sensor nodes 415 connected by the sensor edge 420. The data associated with each of the sensors edges 420 may be represented directly in the graph geometry of the sensor graph 400, where the radial direction of the sensor edge 420 corresponds to the sensed direction, and the length of the sensor edge 420 corresponds to the sensed distance. The sensor graph 400 as initially generated may contain overlapping and disjoint subgraphs. Based on geometric constraints imposed by sensed data, any sensed identification or known co-location of the sensors and the emitter devices, and iterative best-fit type techniques, a subset of the sensor nodes 415 and the sensor edges 420 may be merged, thereby unifying subgraphs and simplifying the sensor graph 400. The system 100 may match the simplified sensor graph 400 with the site graph 600. In a second example, the sensors may not be directional, but the emitter devices may be directional. The direction of the light may be received by the power device 110 from the emitter devices instead of from the sensors.

After the system 100 matches the sensor graph 400 with the site graph 600, the system 100 may associate the fixtures (such as the light fixtures 120) with the directional devices (such as the directional sensors 130 and/or the directional emitter devices). The system 100 may already have generated or determined an association between the directional devices and a topology of hardware. The topology of hardware may indicate which wire or wiring 150 is connected to which device that transmitted and/or received the light signals. Thus, the system 100 may determine an association between any wire or wiring 150 and a corresponding one of the fixtures at a known location and/or a known position indicated by the site model 172.

Figure 8:
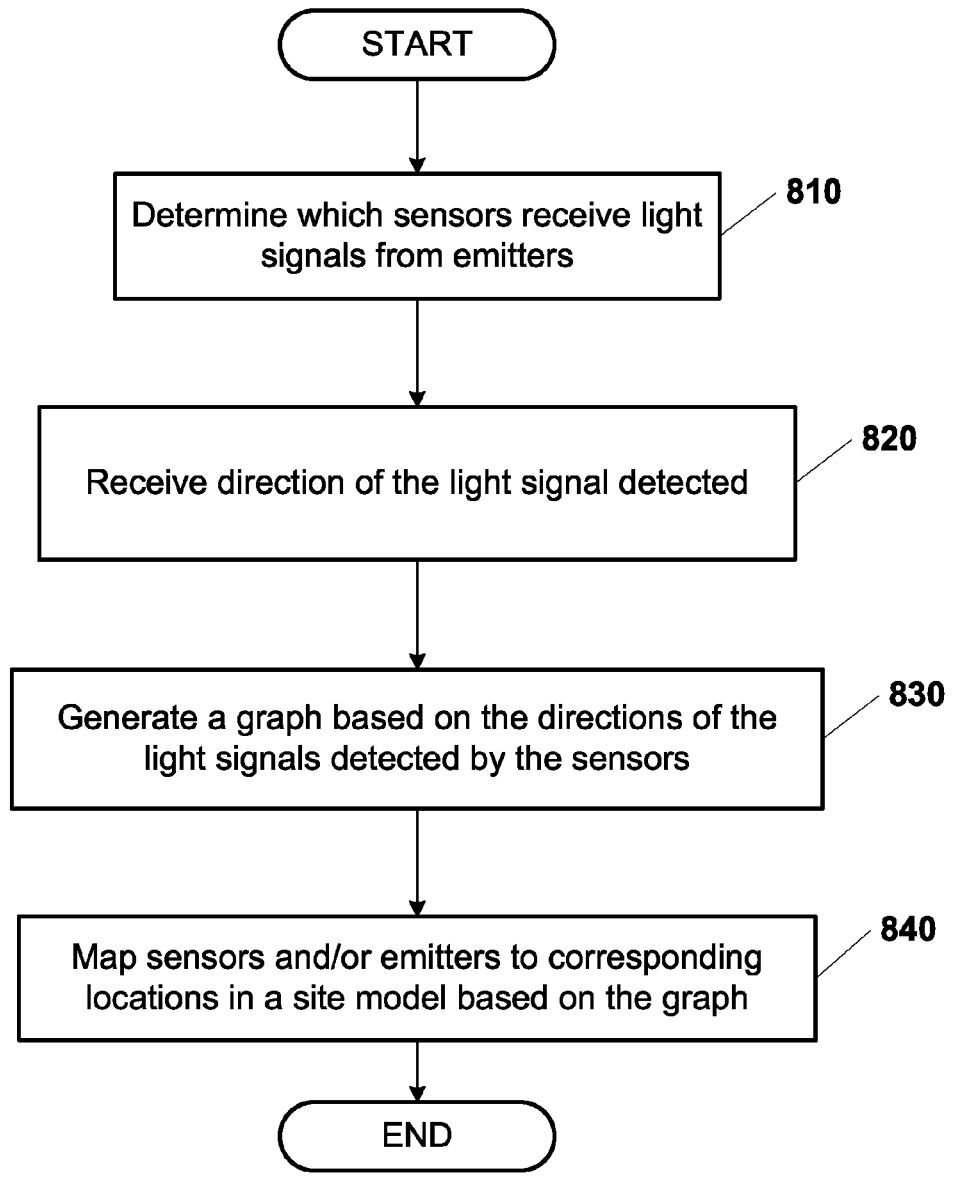
FIG. 8 illustrates an example flow diagram of the logic of an auto-commissioning module.

FIG. 8 illustrates an example flow diagram of the logic of the auto-commissioning module 170. The logic may include additional, different, or fewer operations. The operations may be executed in a different order than illustrated in FIG. 8.

A determination of which of the sensors receive a light signal from any of the emitter devices may be made (810). Each one of the sensors and/or each one of the emitter devices may provide a direction of the light signal detected by a respective one of the sensors.

The direction of the light signal detected by the respective one of the sensors may be received (820). The direction of the light signal may be provided by at least one of the sensors and/or at least one of the emitter devices.

The sensor graph 400 may be generated based on the direction of the light signal that is detected by the sensors (830). The sensor nodes 415 of the sensor graph 400 may represent the sensors and/or the emitter devices.

Each one of the sensors and/or the emitter devices may be mapped to a corresponding location in the site model 172 based on the sensor graph 400 and on the site model 172, where locations of the sensors and/or the emitter devices are indicated by the site model 172 (840). For example, the site graph 600 may be generated from the site model 172, and the nodes of the sensor graph may be correlated with the nodes of the site graph 600.

The operation may end, for example, by identifying the light fixtures 120 associated with the directional sensors 130 in the site model 172, and mapping the light fixtures 120 to locations in the site model 172.

All of the discussion, regardless of the particular implementation described, is exemplary in nature, rather than limiting. For example, although selected aspects, features, or components of the implementations are depicted as being stored in memories, all or part of systems and methods consistent with the disclosure may be stored on, distributed across, or read from other computer-readable storage media, for example, secondary storage devices such as hard disks, floppy disks, and CD-ROMs; or other forms of ROM or RAM either currently known or later developed. The computer-readable storage media may be non-transitory computer-readable media, which includes CD-ROMs, volatile or non-volatile memory such as ROM and RAM, or any other suitable storage device. Moreover, the various modules are but examples of such functionality and any other configurations encompassing similar functionality are possible.

Furthermore, although specific components and modules were described, methods, systems, and articles of manufacture consistent with the disclosure may include additional or different components or modules. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same program. The components may be resident on separate hardware, such as separate removable circuit boards, or share common hardware, such as a same memory and processor for implementing instructions from the memory. Programs may be parts of a single program, separate programs, or distributed across several memories and processors. The modules may be implemented in software, hardware, or any combination thereof.

The respective logic, software or instructions for implementing the processes, methods and/or techniques discussed above may be provided on computer-readable media or memories or other tangible media, such as a cache, buffer, RAM, removable media, hard drive, other computer readable storage media, or any other tangible media or any combination thereof. The tangible media include various types of volatile and nonvolatile storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU"), or system.

To clarify the use in the claims and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superceding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

While various embodiments of the innovation have been described, it will be apparent to those of ordinary skill in the art that many more embodiments and implementations are possible within the scope of the innovation. Accordingly, the innovation is not to be restricted except in light of the attached claims and their equivalents.

What is claimed is:

1. A system for spatially commissioning a lighting system, the system for spatially commissioning comprising:
   a plurality of emitter devices configured to emit a light signal;
   a plurality of sensors configured to detect the light signal, wherein at least one of the sensors and/or at least one of the emitter devices is configured to provide a direction of the light signal detected by at least one of the sensors; and
   an auto-commissioning module configured to:
   determine which of the sensors receive the light signal from any of the emitter devices;
   receive the direction of the light signal detected by the at least one of the sensors, the direction of the light signal provided by the at least one of the sensors and/or the at least one of the emitter devices;
   generate a sensor graph based on the direction of the light signal that is detected by the sensors, wherein nodes of the sensor graph represent the sensors and/or the emitter devices; and
   map at least one of the sensors and/or the emitter devices to a corresponding location in a site model based on the sensor graph and on the site model, wherein locations of the sensors and/or the emitter devices are indicated by the site model.

2. The system of claim 1, wherein the sensors comprise a plurality of directional sensors, and at least one of the directional sensors comprises a plurality of facets, and at least one of the facets determines a field of view of a photosensor coupled to a respective one of the facets.

3. The system of claim 1, wherein the sensors comprise a plurality of directional sensors, and at least one of the directional sensors comprises an opaque divider that determines a field of view of a photosensor coupled to a respective one of the directional sensors.

4. The system of claim 1, wherein at least one of the sensors comprises at least one of the emitter devices.

5. The system of claim 4, wherein the emitter devices comprise a plurality of emitters, at least one of the emitter devices comprises a respective subset of the emitters, at least one of the emitter devices comprises a respective emitter head comprising a plurality of facets, and at least one emitter included in the respective subset of the emitters is coupled to a corresponding one of the facets of the respective emitter head.

6. The system of claim 1, wherein at least one of the emitter devices is included in a respective one of a plurality of light fixtures.

7. The system of claim 1, wherein the sensors comprise daylight sensors, and wherein the auto-commissioning module is further configured to map at least one of the sensors to the corresponding location in the site model based on an amount of daylight detected by the daylight sensors and on the locations of the sensors and/or the emitter devices indicated by the site model.

8. The system of claim 1, wherein the emitter devices comprise a plurality of directional emitter devices, and at least one of the directional emitter devices comprises a plurality of facets, and at least one of the facets determines a field of view of an emitter coupled to a respective one of the facets.

9. A method for spatially commissioning a lighting system, the method comprising:
  determining which of a plurality of sensors receive a light signal from any of a plurality of emitter devices;
  receiving a direction of the light signal detected by at least one of the sensors, the direction of the light signal received from at least one of the sensors and/or at least one of the emitter devices;
  generating a sensor graph based on the direction of the light signal, wherein nodes of the sensor graph represent the sensors and/or the emitter devices; and
  mapping at least one of the sensors and/or the emitter devices to a corresponding location in a site model based on the sensor graph and on the site model.

10. The method of claim 9, wherein mapping at least one of the sensors and/or the emitter devices to the corresponding location in the site model comprises:
  generating a site graph based on locations of the sensors and/or the emitter devices indicated by the site model, wherein nodes of the site graph represent the sensors and/or the emitter devices;
  matching the nodes of the sensor graph with the nodes of the site graph; and
  mapping at least one of the sensors and/or the emitter devices to the corresponding location in the site model based on a match of the nodes of the sensor graph with the nodes of the site graph.

11. The method of claim 9, wherein mapping at least one of the sensors and/or the emitter devices to the corresponding location in the site model comprises generating a graph layout of the sensor graph and correlating the graph layout of the sensor graph spatially with the site model.

12. The method of claim 11, wherein generating the graph layout of the sensor graph comprises generating the graph layout with a modified force-directed technique.

13. The method of claim 9, wherein generating the sensor graph comprises generating the sensor graph based on the direction of the light signal and on estimated distances between the sensors and the emitter devices.

14. The method of claim 13, wherein generating the sensor graph comprises including the direction and the estimated distances as constraints for sensor edges in the sensor graph.

15. The method of claim 9, further comprising:
  receiving, from the sensors, directions of a plurality of light fixtures relative to the sensors;
  generating a light fixture graph from the directions of the light fixtures relative to the sensors, wherein nodes of the light fixture graph represent the light fixtures;
  generating a site graph from the site model, wherein nodes of the site graph represent the light fixtures; and
  mapping at least one of the light fixtures to a corresponding light fixture location in the site model based on a match of the nodes of the light fixture graph with the nodes of the site graph.

16. A tangible non-transitory computer-readable medium encoded with computer executable instructions, the computer executable instructions executable with a processor, the computer-readable medium comprising:
  instructions executable to determine which of a plurality of sensors receive a light signal from any of a plurality of emitter devices;
  instructions executable to receive a direction of the light signal detected by at least one of the sensors, the direction of the light signal received from at least one of the sensors and/or at least one of the emitter devices;
  instructions executable to generate a sensor graph based on the direction of the light signal, wherein nodes of the sensor graph represent the sensors and/or the emitter devices; and
  instructions executable to map at least one of the sensors and/or the emitter devices to a corresponding location in a site model based on the sensor graph and on the site model.

17. The computer-readable medium of claim 16 further comprising instructions executable to map at least one of the sensors and/or the emitter devices to the corresponding location in the site model based on the sensor graph, on the site model, and on motion detected by occupancy sensors.

18. The computer-readable medium of claim 16 further comprising instructions executable to map at least one of the sensors and/or the emitter devices to the corresponding location in the site model based on the sensor graph, on the site model, and on temperature detected by temperature sensors.

* * * * *